United States Patent
Yim et al.

(10) Patent No.: US 9,413,876 B2
(45) Date of Patent: Aug. 9, 2016

(54) MOBILE TERMINAL AND CONTROL METHOD FOR THE MOBILE TERMINAL

(71) Applicant: LG ELECTRONICS INC., Seoul (KR)

(72) Inventors: Soyeon Yim, Seoul (KR); Jisun Lee, Seoul (KR); Seojin Lee, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/562,487

(22) Filed: Dec. 5, 2014

(65) Prior Publication Data

US 2016/0014264 A1    Jan. 14, 2016

(30) Foreign Application Priority Data

Jul. 14, 2014   (KR) .......................... 10-2014-0088472

(51) Int. Cl.
*H04M 1/66* (2006.01)
*H04M 1/725* (2006.01)
*H04W 12/06* (2009.01)

(52) U.S. Cl.
CPC ...... *H04M 1/72577* (2013.01); *H04M 1/72519* (2013.01); *H04W 12/06* (2013.01)

(58) Field of Classification Search
CPC .................... H04M 1/72577; H04M 1/72519; H04W 12/06
USPC .......................... 455/411, 418, 419, 420, 550.1
See application file for complete search history.

(56) References Cited

U.S. PATENT DOCUMENTS

| | | | |
|---|---|---|---|
| 8,934,949 B2 * | 1/2015 | Yeo | H04M 1/0202 455/347 |
| 9,111,076 B2 * | 8/2015 | Park | G06F 3/0412 |
| 2009/0146962 A1 | 6/2009 | Ahonen et al. | |
| 2009/0262074 A1 | 10/2009 | Nasiri et al. | |
| 2010/0088596 A1 | 4/2010 | Griffin et al. | |
| 2011/0298940 A1 * | 12/2011 | Cheong | H04M 1/72522 348/222.1 |
| 2013/0143485 A1 * | 6/2013 | Koshijima | H04W 12/02 455/26.1 |
| 2013/0185680 A1 * | 7/2013 | Chaudhri | G06F 3/04883 715/863 |
| 2015/0264169 A1 * | 9/2015 | Yim | H04M 1/72522 455/411 |

FOREIGN PATENT DOCUMENTS

| | | |
|---|---|---|
| EP | 2584459 A1 | 4/2013 |
| EP | 2674834 A2 | 12/2013 |
| KR | 10-1404234 B1 | 6/2014 |
| KR | 101404234 B1 * | 6/2014 |
| WO | 2013/136548 A1 | 9/2013 |

* cited by examiner

*Primary Examiner* — Khai M Nguyen
(74) *Attorney, Agent, or Firm* — Birch, Stewart, Kolasch & Birch, LLP

(57) ABSTRACT

A mobile terminal including a terminal body; a wireless communication unit configured to provide wireless communication; a display unit, and a controller configured to deactivate the display unit, and receive a plurality of taps applied to the deactivated display unit, and display information of a preset function on the display unit based on a tapped pattern formed with the plurality of taps matching a preset pattern and a current state of the terminal.

20 Claims, 35 Drawing Sheets

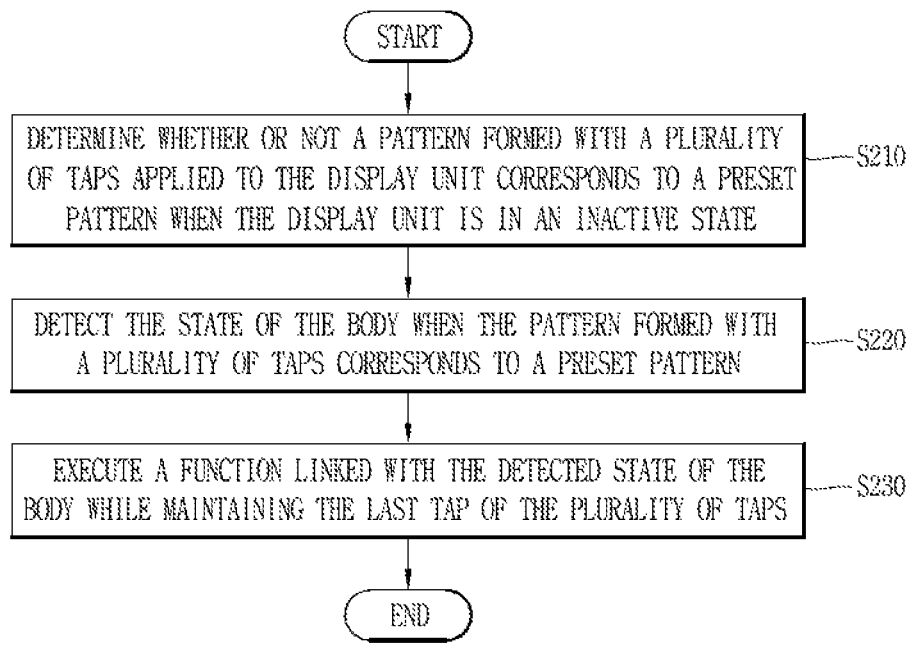

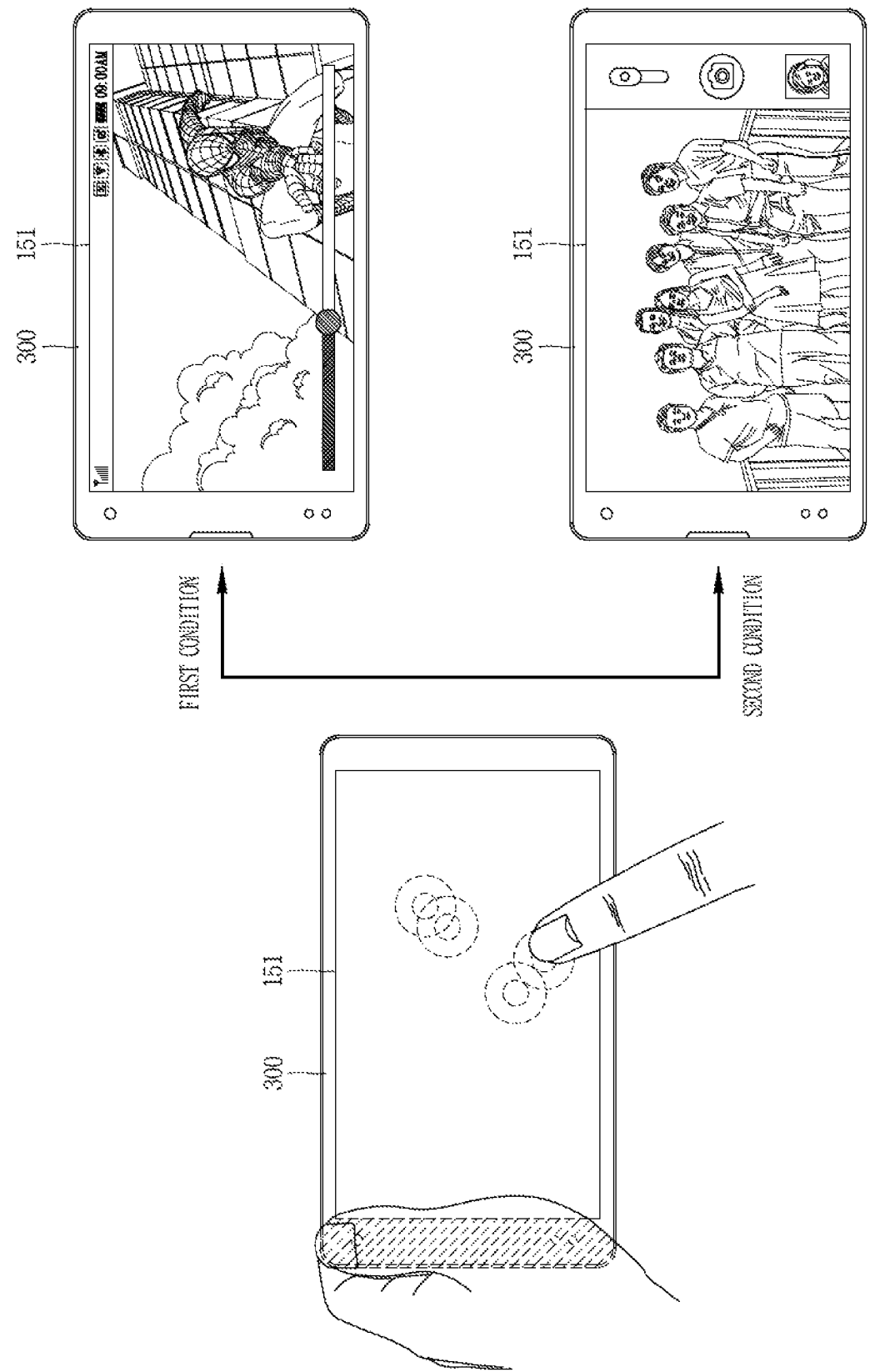

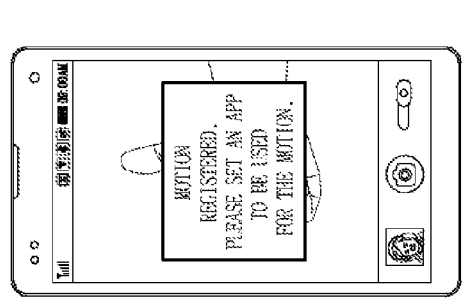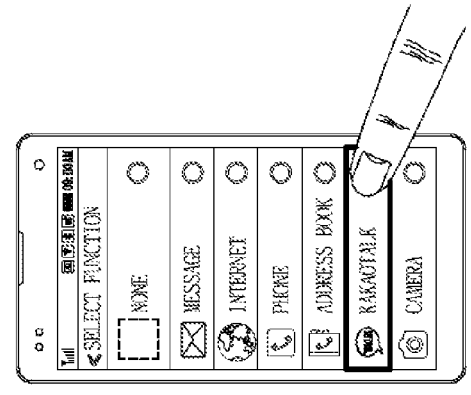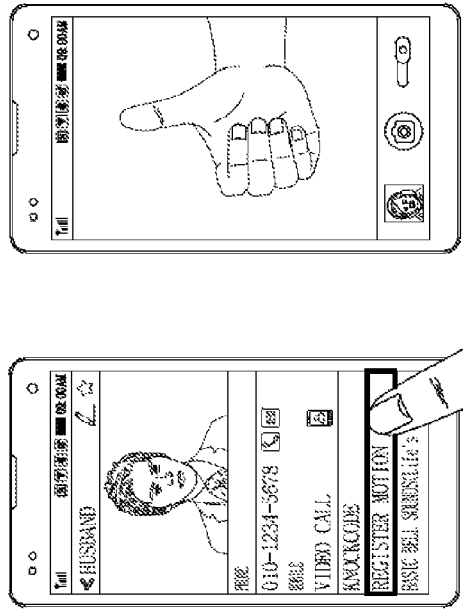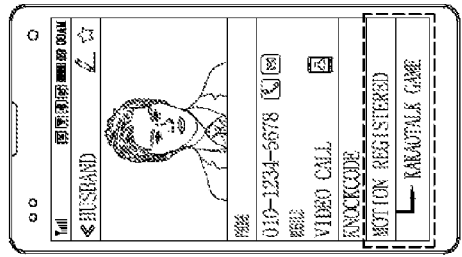

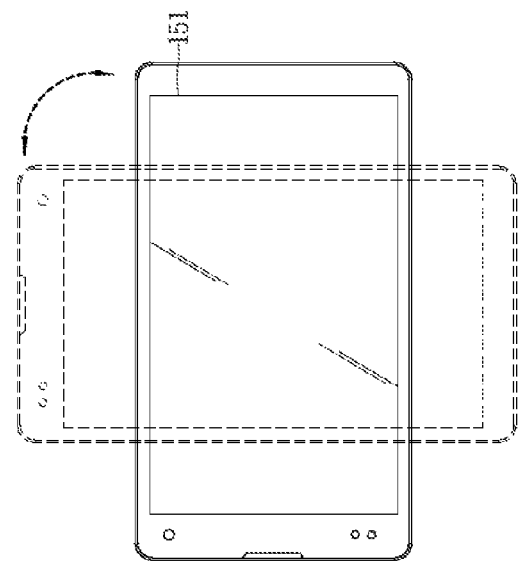
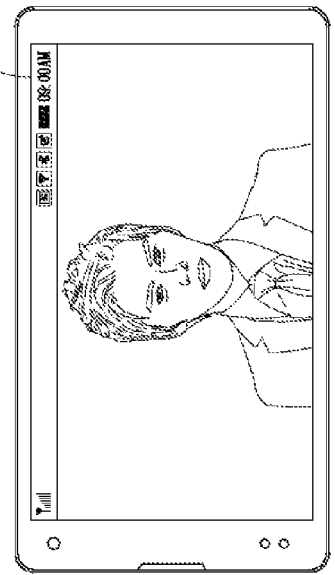
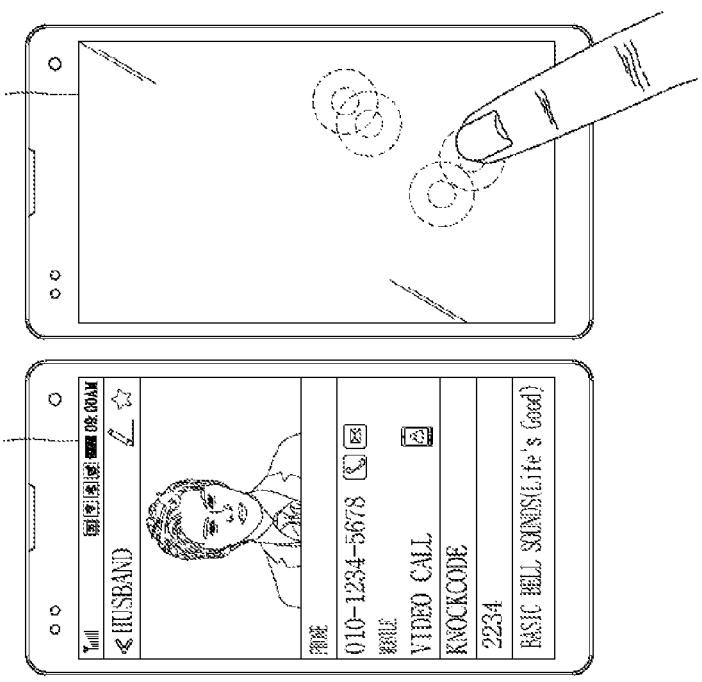
FIG. 6E(a)  FIG. 6E(b)  FIG. 6E(c)

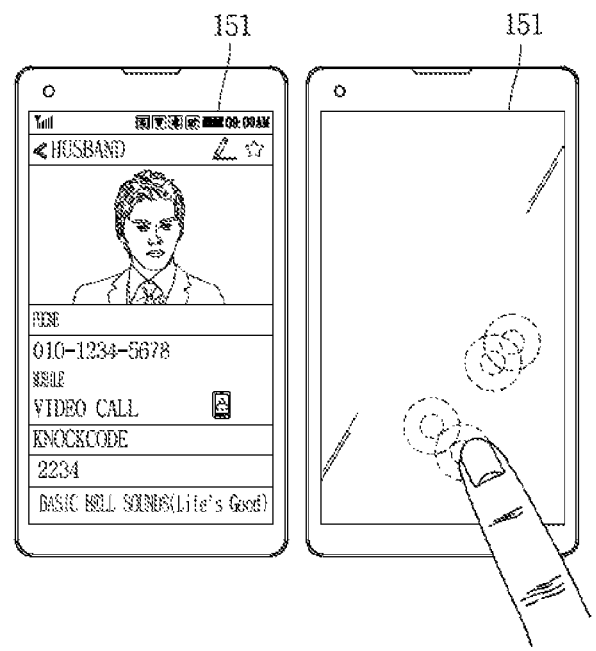
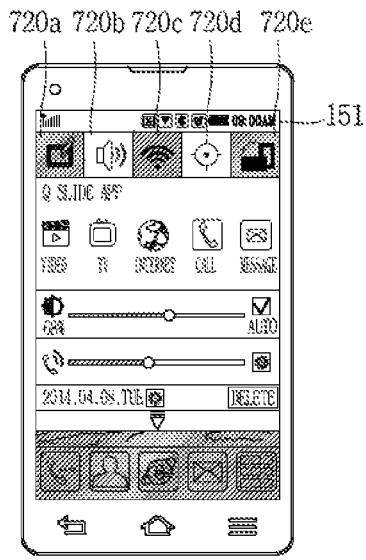
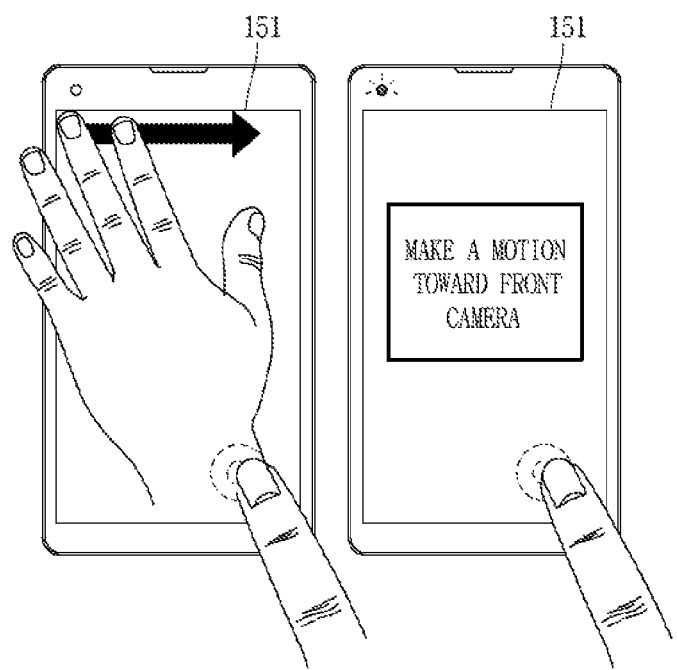
FIG. 7A(a)
FIG. 7A(b)
FIG. 7A(c)

MOBILE TERMINAL AND CONTROL METHOD FOR THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0088472, filed on Jul. 14, 2014 the contents of which is incorporated by reference herein in its entirety.

BACKGROUND OF THE INVENTION

1. Field of the Invention

The present invention relates to a mobile terminal and corresponding method for sensing a tap hitting a display unit when the display unit is in an inactive state.

2. Description of the Related Art

Terminals may be divided into mobile/portable terminals and stationary terminals. Also, the mobile terminals may be classified into handheld terminals and vehicle mounted. A mobile terminal can also capture still images or moving images, play music or video files, play games, receive broadcast and the like, so as to be implemented as an integrated multimedia player.

In addition, the user interface on the mobile terminal is complex in order to handle the numerous functions provided on the mobile terminal. However, the user interface is often cumbersome for the user to use.

SUMMARY OF THE INVENTION

Accordingly, one object of the present invention is to address the above-noted and other problems with the related art.

Another object of the present invention is to provide a mobile terminal and corresponding method for applying a tap hitting an object on an inactive display unit to control the terminal.

Another object of the present invention is to provide a method of controlling a mobile terminal using a user control command through a gesture along with taps applied to an inactive display unit.

To achieve these and other advantages and in accordance with the purpose of the present invention, as embodied and broadly described herein, the present invention provides in one aspect a mobile terminal including a terminal body; a wireless communication unit configured to provide wireless communication; a display unit, and a controller configured to deactivate the display unit, and receive a plurality of taps applied to the deactivated display unit, and display information of a preset function on the display unit based on a tapped pattern formed with the plurality of taps matching a preset pattern and a current state of the terminal. The present invention also provides a corresponding method of controlling the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flow chart illustrating a method of performing a function linked with a control command based on the control command applied to the display unit while maintaining the inactive state of the display unit;

DETAILED DESCRIPTION OF THE INVENTION

Hereinafter, an embodiment disclosed in the present invention will be described in detail with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

Although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the configuration according to the embodiments of this specification can also be applied to stationary terminals such as digital TV, desktop computers and the like, excluding a case of being applicable only to the mobile terminals.

Figure 1A:
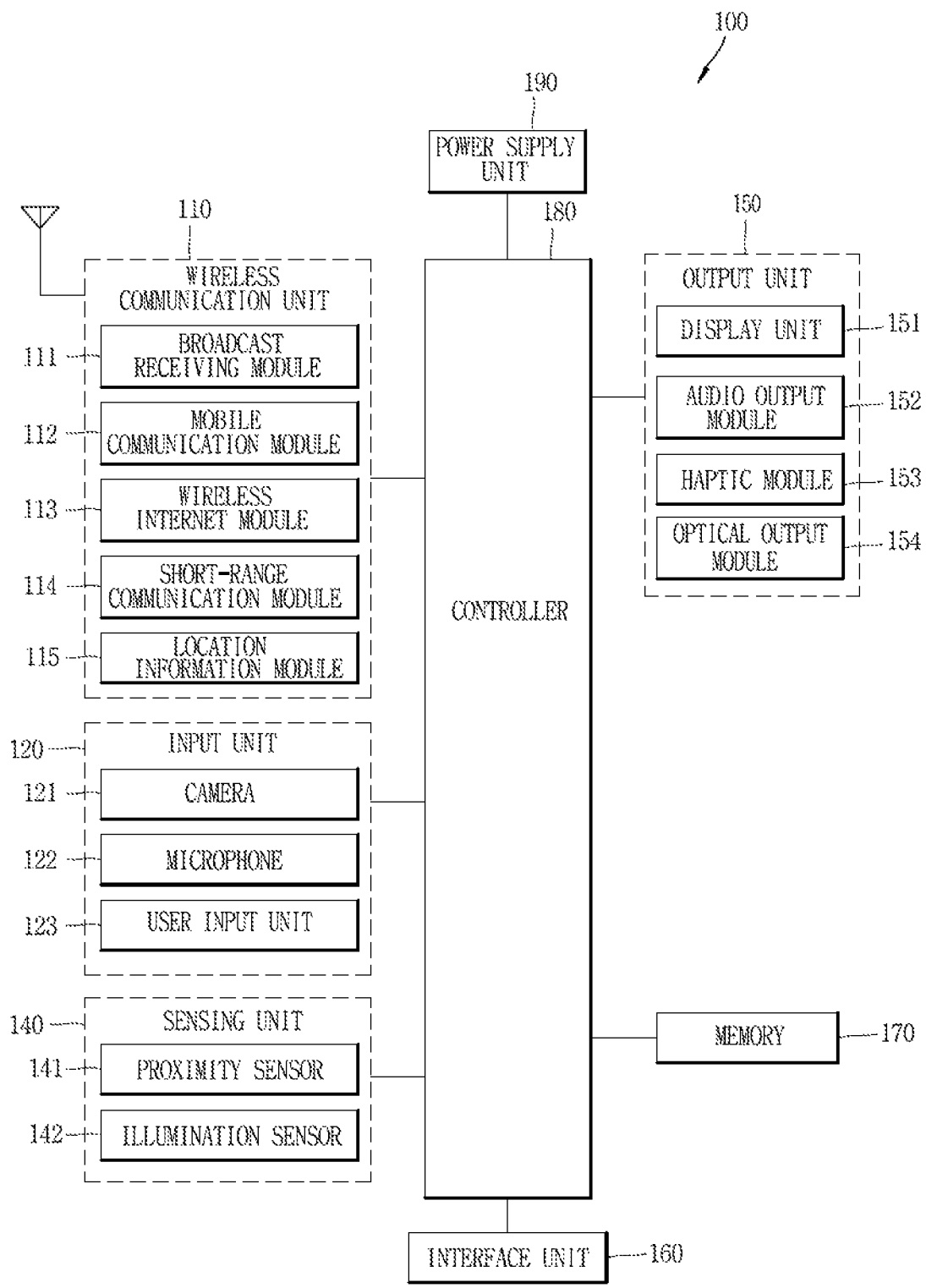
FIG. 1A is a block diagram illustrating a mobile terminal according to an embodiment of the present invention.
Figure 1B:
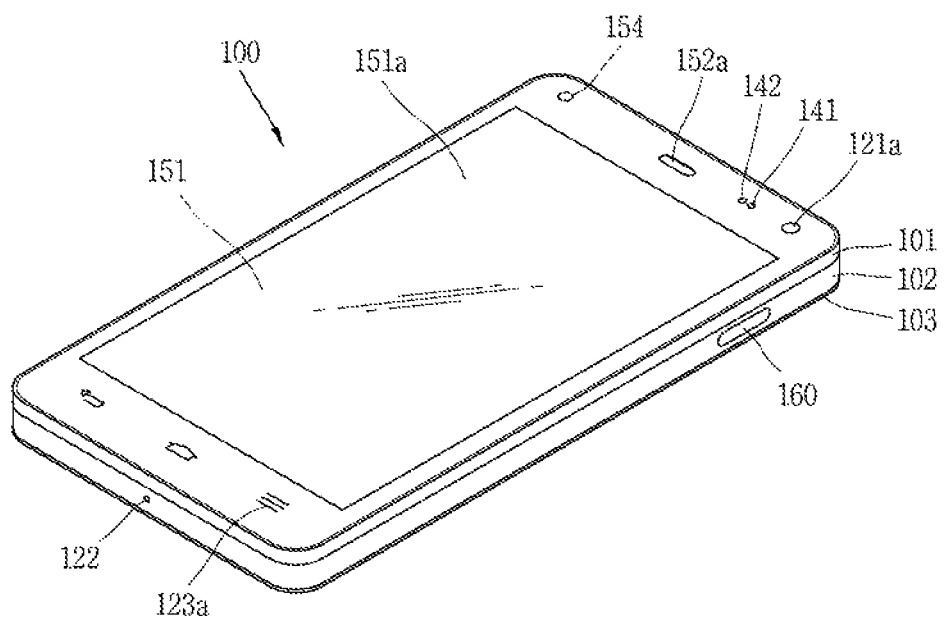
FIGS. 1B and 1C conceptual views in which an example of a mobile terminal according to an embodiment of the present invention is seen from different directions.
Figure 1C:
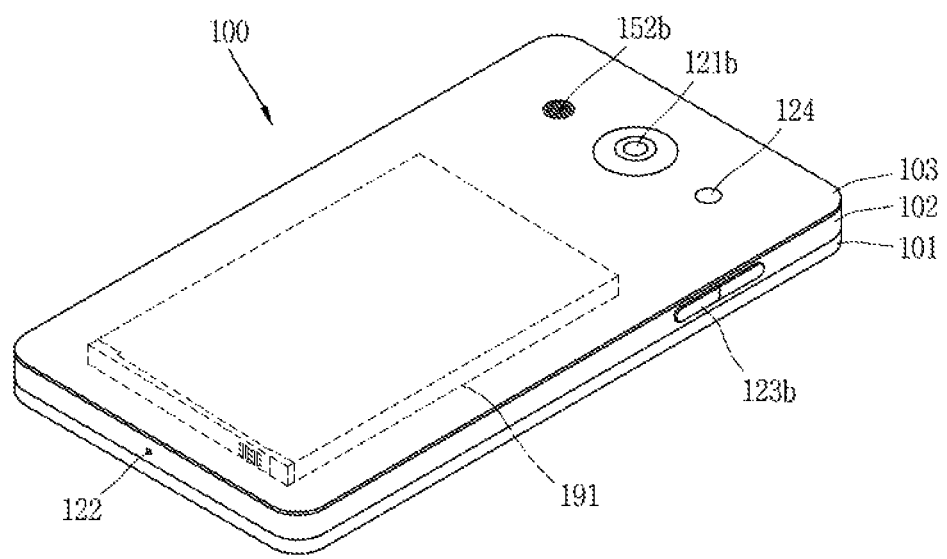

Referring to FIGS. 1A through 1C, FIG. 1A is a block diagram of a mobile terminal in accordance with an embodiment of the present invention, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but implementing all of the illustrated components is not a requirement. Greater or fewer components may alternatively be implemented.

In more detail, the wireless communication unit 110 may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

Furthermore, the controller 180 can control at least part of the components illustrated in FIG. 1, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller

180. The power supply unit 190 may include a battery, and the battery may be an embedded battery or a replaceable battery.

At least part of those elements and components may be combined to implement operation and control of the mobile terminal or a control method of the mobile terminal according to various embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to an embodiment of the present invention, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data for the location of the mobile terminal in a substitutional or additional manner. The location information module 115 may be a module used to obtain the location (or current location) of the mobile terminal, and may not be necessarily limited to a module for directly calculating or obtaining the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

Further, the sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, the proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Further, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program. Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (1/O) ports, video I/O ports, earphone ports, or the like.

Further, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

Further, as aforementioned, the controller 180 can typically control the general operations of the mobile terminal 100. For example, the controller 180 can set or release a locked state for restricting a user from inputting a control command with respect to applications when a status of the mobile terminal meets a preset condition.

Furthermore, the controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various embodiments disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Further, various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present invention is not limited to this, but also may be applicable to various structures such as watch type, clip type, glasses type or folder type, flip type, slide type, swing type, swivel type, or the like, in which two and more bodies are combined with each other in a relatively movable manner.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101. In some instances, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some instances, upon the coupling, the rear case 102 may also be completely shielded by the rear cover 103. Further, the rear cover 103 may include an opening for externally exposing a camera 121*b* or an audio output module 152*b*. The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152*a* and 152*b*, a proximity sensor 141, an illumination sensor included in an optical output module 154, first and second cameras 121*a* and 121*b*, first and second manipulation units 123*a* and 123*b*, a microphone 122, an interface unit 160 and the like.

Hereinafter, description will be given of an mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Furthermore, the display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

Further, the touch sensor may be configured in a form of film having a touch pattern. The touch sensor may be a metal wire, which is disposed between the window 151*a* and a display on a rear surface of the window 151*a* or patterned directly on the rear surface of the window 151*a*. Or, the touch sensor may be integrally formed with the display. For example, the touch sensor may be disposed on a substrate of the display or within the display.

Thus, the display unit 151 may form a touch screen together with the touch sensor. Here, the touch screen may serve as the user input unit 123 (see FIG. 1A). Therefore, the touch screen may replace at least some of functions of the first manipulation unit 123*a*.

The first audio output module 152*a* may be implemented in the form of a receiver for transferring voice sounds to the user's ear or a loud speaker for outputting various alarm sounds or multimedia reproduction sounds.

The window 151*a* of the display unit 151 may include a sound hole for emitting sounds generated from the first audio output module 152*a*. Here, the present invention is not limited to this. It may also be configured such that the sounds are released along an assembly gap between the structural bodies (for example, a gap between the window 151*a* and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings illustrate the first manipulation unit 123a is a touch key, but the present invention is not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present invention is not limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123. The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials.

When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

Furthermore, a mobile terminal according to an embodiment of the present invention capable of including at least one of the foregoing constituent elements may perform a function linked with a control command based on the control command applied when the display unit is in an inactive state.

Here, the display unit 151 in an inactive state denotes the illumination of the display unit 151 is turned off not to display screen information associated with a function performed in the mobile terminal. On the contrary, the display unit 151 in an active state denotes the illumination of the display unit 151 is turned on to display the screen information.

Furthermore, a mobile terminal according to an embodiment of the present invention may be placed in a locked state in which the reception of a control command applied from a user is limited when the display unit is deactivated. Here, when the mobile terminal is in a locked state, the execution of executable functions in the mobile terminal is limited to the user. Accordingly, the user has to switch the locked state to a released state, and then execute the executable functions.

In addition, in order to switch the locked state to a released state, a mobile terminal in the related art may activate the display unit 151 and then receive a user's control command for switching a locked state to a released state. Further, a user's control command for switching the locked state to a released state can be formed with a plurality of taps applied when the display unit 151 is in an inactive state. More specifically, when a plurality of taps are applied while the display unit is in an inactive state, the controller 180 can switch the locked state to a released state when a pattern formed with the plurality of taps corresponds to a preset pattern. Furthermore, the controller 180 can switch a locked state to a released state based on a plurality of taps being applied within a preset period of time.

Further, an embodiment of the present invention provides a method of executing a function linked with a control command applied in an inactive state of the display unit 151 without an additional procedure of first switching a locked state to a released state. In particular, FIG. 2 is a flow chart illustrating a method of performing a function linked with a control command applied to the display unit while maintaining the inactive state of the display unit. Furthermore, FIGS. 3A, 3B and 3C and FIGS. 4A and 4B are conceptual views illustrating a control method in FIG. 2.

As shown in FIG. 2, the controller 180 can sense whether or not a pattern formed with a plurality of taps applied to the display unit corresponds to a preset pattern when the display unit is in an inactive state (S210). In addition the mobile terminal may be in a locked state when the display unit 151 is in an inactive state. Furthermore, the mobile terminal may be in a released state even when the display unit 151 is in an inactive state. Here, whether or not the mobile terminal is in a locked state or released state will be determined by the user's selection or a preset condition.

Furthermore, the mobile terminal can perform the same operation without distinguishing between when the mobile terminal is in a locked state or in a released state, but also perform a preset operation based on a different control command by distinguishing between when the mobile terminal is in a locked state or in a released state. Here, a different control command denotes a control command in which a plurality of taps applied when the display unit is in an inactive state form a pattern, and a control command applied a preset number of times within a preset period of time without asking whether or not the plurality of taps form a pattern.

Furthermore, one embodiment of the present invention can distinguish if the mobile terminal is in a locked state or in a released state, and moreover, may perform a different operation based on a different control command. For example, when the mobile terminal is in a locked state, the controller 180 can detect whether or not a pattern formed with a plurality of taps corresponds to a preset pattern to switch the locked state to a released state. Then, the controller 180 can switch the locked state to a released state, and perform a preset function based on a control command applied in the released state.

On the contrary, when the mobile terminal is in a released state, the controller 180 can perform a preset function based on a control command applied immediately after the plurality of taps are applied or only after the plurality of taps are applied within a preset period of time. Hereinafter, when an additional manipulation is not applied when the display unit is in an inactive state denotes that the mobile terminal is in a locked state. However, the present invention is not limited to this, and may be also applicable to when the mobile terminal is in a released state.

Furthermore, when the mobile terminal is in a released state, the controller 180 can perform a preset function based on a plurality of taps or the state of the body. In other words, when the mobile terminal is in a released state, the controller 180 does not determine whether or not a plurality of taps forms a pattern but determines whether or not a plurality of taps are applied within a preset period of time.

Further, a mobile terminal according to an embodiment of the present invention may include a tap sensing unit for sensing a tap applied to the display unit 151 when the display unit 151 is in an inactive state. In other words, when the mobile terminal is in a locked state, the controller 180 can sense a plurality of taps hitting the display unit 151 though the reception of a control command received from the user. Here, the tap may be a tap hitting the body. In other words, a tap may be defined as a simple gesture for which the user hits an object.

The mobile terminal may be in a doze mode state in which a tap sensing unit is activated every preset period of time to sense a tap applied when the display unit 151 is in an inactive state. Here, the doze mode is a mode in which a tap sensing unit is activated every preset period of time to sense a tap applied to the display unit. In this instance, the mobile terminal can reduce power consumption than in an active mode in which the tap sensing unit is always activated.

When a tap is sensed in a doze mode state, the controller 180 can be switched to an active mode. Then, the controller 180 can enter a doze mode again when a tap is not sensed for a preset period of time. When a plurality of taps are sensed while the display unit 151 is in an inactive state, the controller 180 can determine whether or not a pattern formed with the sensed plurality of taps corresponds to a preset pattern.

The preset pattern may be set by the user, or preset during factory shipment. For example, the user can set a pattern using a pattern setting function provided in a mobile terminal. The controller 180 can form a pattern using a combination of the plurality of taps. More specifically, the controller 180 can form a pattern by sequentially connecting regions to which the plurality of taps are applied.

Here, the pattern may be set by sequentially tapping preset regions. More specifically, the display unit 151 may be divided into at least two regions. For example, the display unit 151 may be divided into four quadrants. Furthermore, identification numbers may be sequentially assigned to the four quadrants from an upper left side thereof (for example, from a first quadrant to a fourth quadrant). Here, the controller 180 can set taps sequentially applied to each quadrant in a preset order to a pattern. In one example, the display unit 151 is divided into four quadrants, but the display unit 151 may be also divided into various numbers other than four quadrants.

Here, when the number and sequence of applied taps constituting a pattern are the same, the controller 180 can recognize this as the same pattern even when at least one of the size and location of the applied pattern is different. In other words, the pattern may denote identity in form or shape. More specifically, when the pattern is applied to one region of the display unit 151 with a size smaller than a preset value, the controller 180 can recognize it as the same pattern to execute a function linked with the pattern.

Further, even though the following drawing illustrates a touch is applied using a finger, various tools capable of applying a touch to the display unit 151, such as a stylus pen or the like, can be also used. Furthermore, the controller 180 can sense a plurality of taps being applied within a preset period of time when the display unit 151 is in an inactive state.

Hereinafter, when a pattern formed with a plurality of taps applied to the display unit 151 in an inactive state corresponds to a preset pattern will be described below, but the present invention is also applicable to when the plurality of taps are applied within a preset period of time.

When a pattern formed with the plurality of taps corresponds to a preset pattern, the controller 180 can perform a function matched to the preset pattern. Meanwhile, the controller 180 can ignore the plurality of taps when a pattern formed with the plurality of taps does not correspond to a preset pattern.

Here, when a pattern applied to the display unit 151 does not correspond to a preset pattern, the controller 180 does not perform a voice recognition function. For example, the controller 180 does not execute any function on the mobile terminal when a wrong pattern is recognized.

Moreover, when a pattern that does not correspond to the preset pattern is sensed repeatedly a predetermined number of times, the controller 180 can output notification information indicating that a wrong pattern is received. The notification information may be output in at least one of visual, auditory and tactile schemes. Through this, an embodiment of the present invention guides the user to discontinue a wrong pattern input, and provide a correct pattern input.

A function matched to the preset pattern may be various executable functions in a mobile terminal such as a function associated with the operation of the mobile terminal, a function for performing a specific application, and the like. For example, the function matching the preset pattern may be a function for switching a locked state to a released state, for executing an application matching the preset pattern among applications installed in the mobile terminal, and the like.

When a pattern formed with the plurality of taps corresponds to a preset pattern, the controller 180 detects the state of the mobile terminal body (S220). Here, the state of the body denotes a posture of the body, whether or not there is an object in the vicinity of the body, whether or not there is an application currently being executed, whether or not the mobile terminal is connected to an external device, and various overall situations associated with the body such as a movement of the body, and the like.

More specifically, a mobile terminal according to an embodiment of the present invention may further include a gravity sensor. Here, the posture of the body may be defined as a first posture in a direction corresponding to a reference line and a second posture in a direction making an angle of 90 degrees with the reference line based on the reference line in a direction corresponding to the gravity direction. In the following description, the mobile terminal enters a vertical mode when the mobile terminal is in the first posture, and enters a horizontal mode when the mobile terminal is in the second posture.

In addition, the controller 180 can detect the first and the second posture using a gravity sensor, but detect them based on a region in which a touch is applied to a bezel portion of the mobile terminal. More specifically, a mobile terminal according to an embodiment of the present invention may further include a touch sensor in a bezel portion disposed at an edge of the body. In this instance, the controller 180 can determine whether or not the body is in either one of the first and the second posture according to a bezel region of the body to which a touch is applied.

Furthermore, the posture of the body is not limited to the first and the second posture, and is defined in various ways such as when the body is placed at a specific angle, and the like. Furthermore, a mobile terminal according to an embodiment of the present invention may further include a proximity sensor unit for sensing whether or not there exists an object within a preset distance based on the body.

In addition, the controller 180 can determine the state of the body according to whether or not there is an object in the vicinity of the body using the proximity sensor unit. For example, when there is an object in the vicinity of the body, the controller 180 can determine that the user is performing a call with an external terminal.

Furthermore, when the body is connected to an external device means the external device is connected in a wired or wireless manner to the body. For example, the controller 180 can sense when the body is connected to an earphone in a wired manner. Also, the terminal may include when the body is mounted on a preset external device. For example, the controller 180 can sense that the body is mounted on a cradle using a magnetic flux change or the like.

In addition to the foregoing description associated with the state of the body, the state of the body may be defined in various ways. Furthermore, the step of sensing the state of the body and the step of sensing the plurality of taps may be performed at the same time. In other words, the two steps (S210 and S220) may be sequentially performed, or the order can be changed to each other, and moreover, performed at the same time. Furthermore, a different function may be performed according to the order of the steps S210 and S220.

Subsequent to detecting the state of the body, the mobile terminal executes a function associated with the detected state of the body when the last tap of the plurality of taps is maintained (S230). The controller 180 can detect whether or not a tap that has been finally applied to the display unit 151 while detecting the state of the body. In other words, the controller 180 can detect whether or not a tap that has been finally applied among the plurality of taps is continuously applied.

When the last tap is not maintained, the controller 180 does not perform a function linked with the state of the body. In other words, an embodiment of the present invention can determine whether or not to execute a function linked with the state of the body according to whether or not the last tap is maintained. The present invention is not limited to this, and can execute a function linked with the state of the body when the pattern corresponds to a preset pattern regardless of whether or not the last tap is maintained.

When a function linked with the state of the body is performed, the controller 180 can switch the display unit 151 in an inactive state to an active state, and switch the locked state of the mobile terminal to a released state. Here, an additional procedure to switch the locked state of the mobile terminal to a released state can be omitted.

Thus, an embodiment of the present invention temporarily switches the terminal to a released state only for the execution of a function linked with the state of the body, or switches the terminal to a released state only for the execution of the entire function of the mobile terminal. When temporarily switched to a released state, the terminal can be switched to a locked state again upon receiving a control command associated with a function different from the function linked with the state of the body.

Further, subsequent to the execution of the function linked with the state of the body, the controller 180 can no longer sense whether or not the last tap is maintained. In other words, when the function linked with the state of the body is performed, the controller 180 can no longer require the maintaining of the last tap. In addition, even when the last tap is no longer sensed, the function linked with the state of the body can be continuously performed.

An embodiment of the present invention may immediately perform a preset function with no additional manipulation based on the state of the body sensed along with a plurality of taps applied when the display unit 151 is in an inactive state. Thus, a mobile terminal with an enhanced user convenience is provided.

Figure 3B:
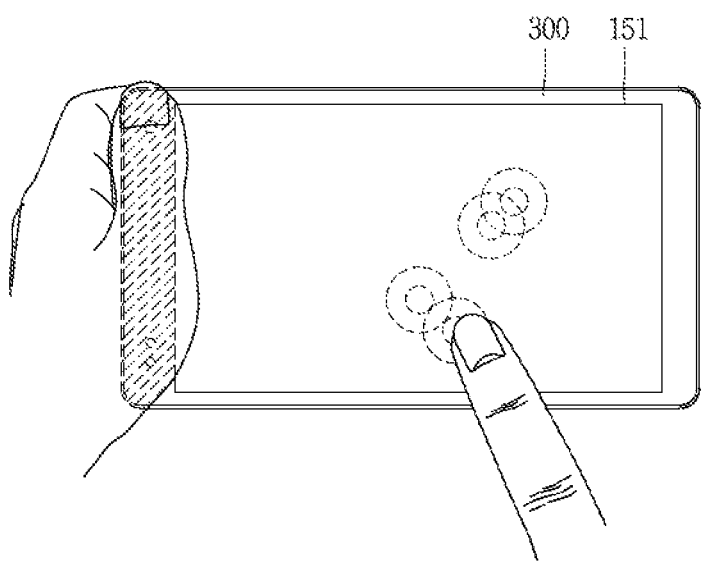
FIGS. 3A, 3B(a) to 3B(c) and 3C(a) to (d) are conceptual views illustrating a control method in FIG. 2.
Figure 3B:
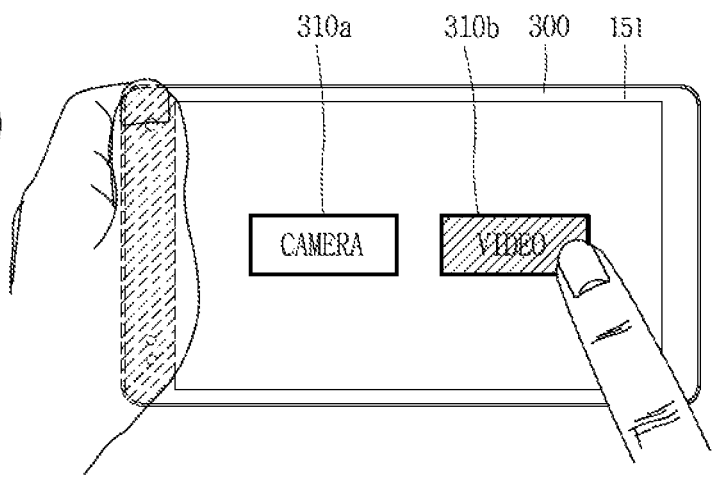
Figure 3B:
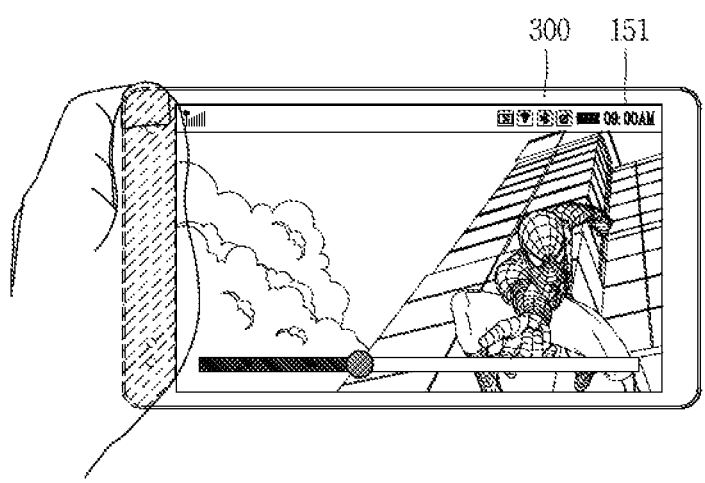

Hereinafter, embodiments of the invention will be described in more detail with reference to FIGS. 3A to 3C, 4A and 4B. As discussed above, the mobile terminal according to an embodiment of the present invention senses a plurality of taps applied when the display unit 151 is in an inactive state. For example, as illustrated in FIG. 3A the controller 180 can sense a plurality of taps applied when the display unit 151 is in an inactive state.

Concurrently, the controller 180 can sense the state of the body. For example, as illustrated in FIG. 3A, the controller 180 can detect a current posture of the body based on a touch region sensed on the bezel 300 of the body. More specifically, the controller 180 can sense that the state of the body is currently in a horizontal mode state based on a touch applied to a specific region of the bezel 300 of the body.

The controller 180 can execute a function linked with the state of the body based on a pattern formed with the sensed plurality of taps that corresponds to a preset pattern, and a tap that has been finally applied among the plurality of taps being maintained. Here, a plurality of functions can be linked with the state of the body. In this instance, the controller 180 can execute any one of the plurality of functions, or perform any one of the plurality of functions based on the user's selection.

For example, as illustrated in FIG. 3A, when the body is in a horizontal mode (e.g., landscape), and a plurality of taps corresponding to a preset pattern is sensed, the controller 180 can execute either one of a first function associated with the playing of video and a second function for receiving an image from a camera. In addition, the controller 180 can execute either one of the first and the second functions according to whether or not an image is received from the camera 121 provided in the mobile terminal. Also, whether or not an image is received from the camera 121 can be determined based on whether or not there is an object in a region adjacent to a front side of the camera 121 using a proximity sensor provide in a region adjacent to the camera 121.

For example, when there is an object in a region adjacent to a front side of the camera 121 (it may be referred to as a "first condition"), the controller 180 can determine that an image cannot be currently received from the camera 121. In this instance, as illustrated in FIG. 3A, the controller 180 can execute a first function associated with the playing of video.

In another example, when there is no object in a region adjacent to a front side of the camera 121 (it may be referred to as a "second condition"), the controller 180 can determine an image can be currently received from the camera 121. In this instance, as illustrated in FIG. 3A, the controller 180 can display an image received from the camera 121 on the display unit 151.

Furthermore, the controller 180 can execute either one of the first and the second function based on a preset condition, and also execute either one of the first and the second function based on the user's selection. For example, as illustrated in FIG. 3B(a), the controller 180 can sense a plurality of taps when the display unit 151 is in an inactive state, and determine whether or not the plurality of taps correspond to a preset pattern. Furthermore, the controller 180 can detect that the state of the body is in a horizontal mode according to a touch region applied to the bezel of the body.

Here, when at least two functions linked with the detected state of the body are detected, the controller 180 can display a graphic object indicating each function on the display unit 151. For example, as illustrated in FIG. 3B(b), the controller 180 can display graphic objects 310a and 310b indicating the first and the second function, respectively, on the display unit 151.

Then, the controller 180 can execute either one function selected by the user. For example, as illustrated in FIG. 3B(c), when the graphic object 310b indicating a second function associated with the play of video is selected, the controller 180 can execute the second function.

Figure 3C:
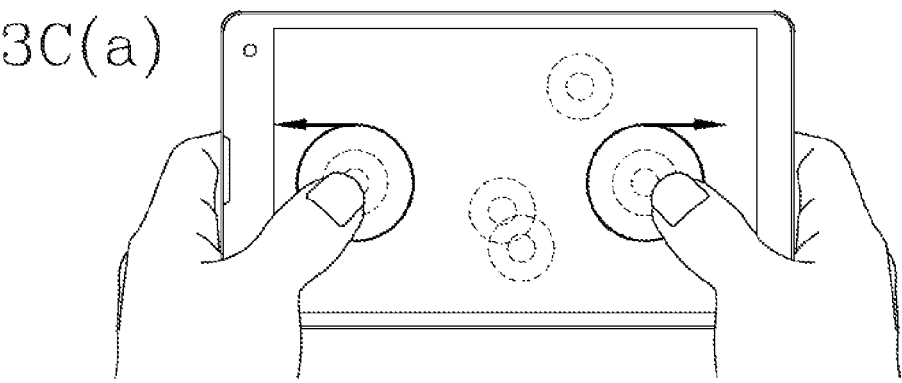
Figure 3C:
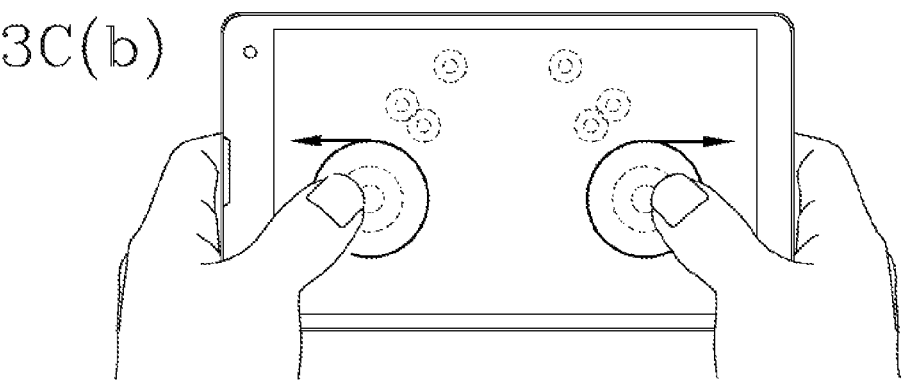
Figure 3C:
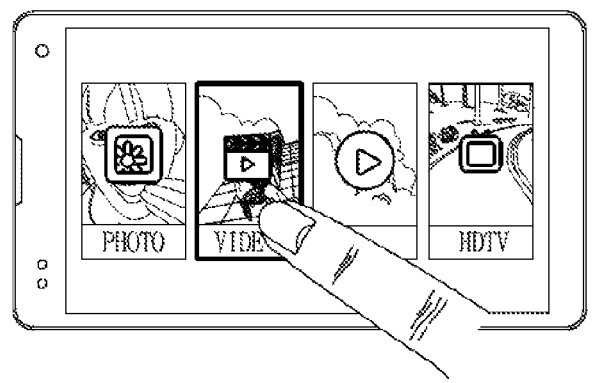
Figure 3C:
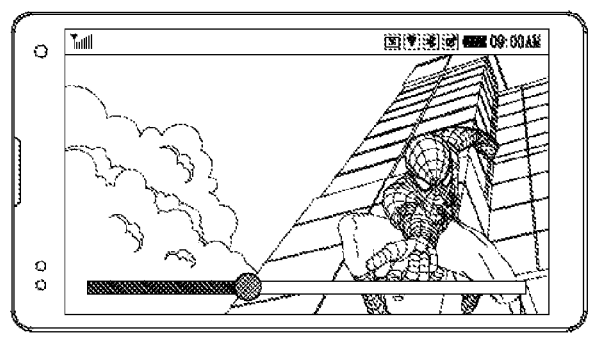

Moreover, the controller 180 can sense taps concurrently applied to at least two regions when the display unit is in an inactive state. For example, as illustrated in FIGS. 3C(a) and 3C(b), the controller 180 can sense taps at the same time in at least two regions. More specifically, referring to FIG. 3C(a), the controller 180 can sense a plurality of taps applied to any one region of the display unit 151 when a tap applied any one region is maintained. On the contrary, referring to FIG. 3C(b), the controller 180 can sense that a plurality of taps forming the same pattern are concurrently applied to at least two regions.

In addition, the controller 180 can sense that the taps applied in at least two regions are dragged at the same time. For example, as illustrated in FIGS. 3C(a) and 3C(b), the controller 180 can sense taps applied to at least two regions and consecutive drag inputs. More specifically, as illustrated in FIG. 3C(a), the user can drag a tap maintained in the any one region and the last tap of a plurality of taps applied to another region at the same time. Furthermore, the controller 180 can sense the last taps of a plurality of taps, respectively, forming the same pattern applied to at least two regions and consecutive drags.

In addition, the controller 180 can detect at least one function linked with the state of the body based on the state of the body. For example, when the state of the body is in a horizontal mode, the controller 180 can detect an application frequently used in the horizontal mode. In addition, as illustrated in FIG. 3C(c), the controller 180 can activate the display unit 151, and display a graphic object indicating the frequently used application on the display unit 151. Thus, the user can select any one of the graphic objects, and execute an application indicated by the any one graphic object.

In the above, an example in which the state of the body is in a horizontal mode has been described. Hereinafter, when the state of the body varies will be described. A mobile terminal according to an embodiment of the present invention may further include a posture sensing unit for sensing a posture of the body 100. Here, the posture sensing unit may sense the extent in which the body 100 is inclined based on the gravity direction (hereinafter, defined as an "angle of the body").

When a pattern formed with a plurality of taps applied while the display unit 151 is in an inactive state corresponds to a preset pattern, and the angle of the body 100 is inclined more than a preset angle, the controller 180 can execute a function linked with the angle of the body 100.

Figure 4A:
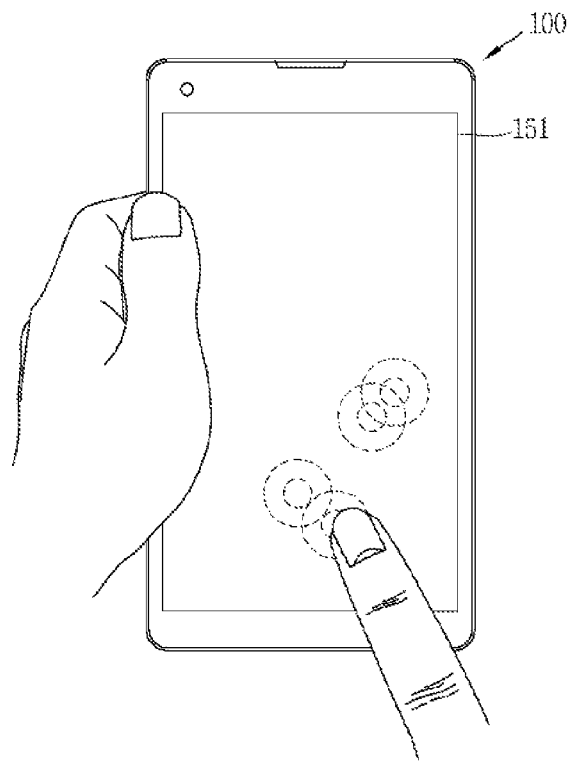
FIGS. 4A(a) to (c) and 4B(a) to (c) are conceptual views illustrating a control method in FIG. 2.
Figure 4A:
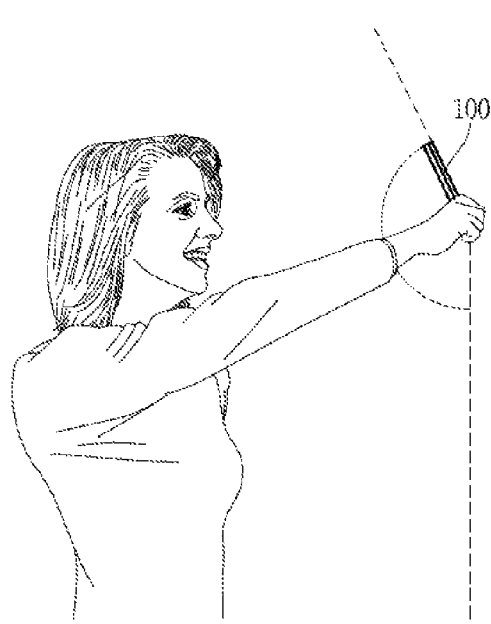
Figure 4A:
Figure 4B:
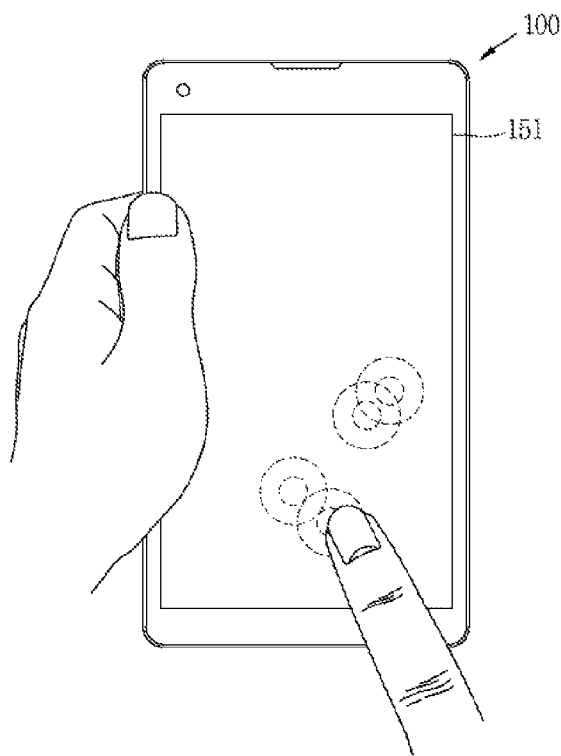
Figure 4B:
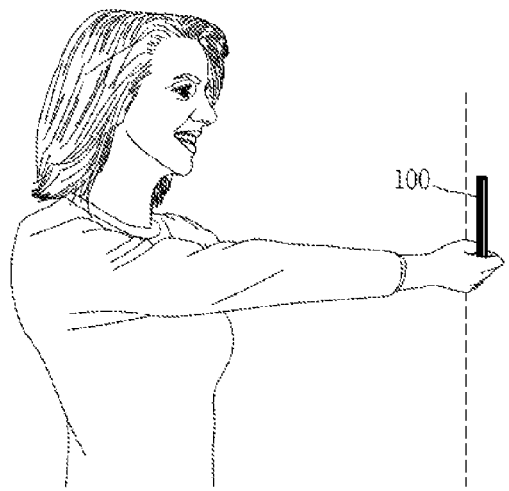
Figure 4B:
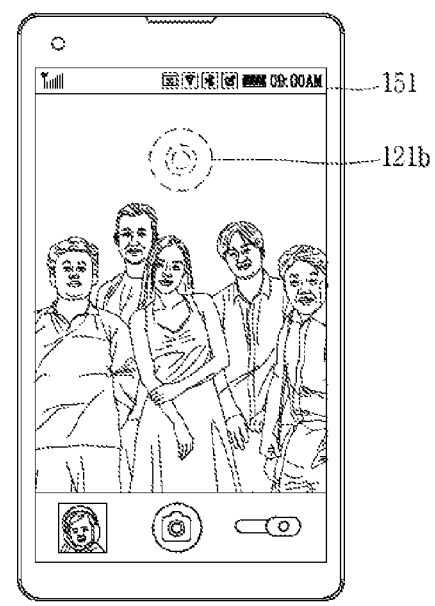

More specifically, as illustrated in FIGS. 4A(a) and 4A(b), the controller 180 can sense that a pattern formed with a plurality of taps applied while the display unit 151 is in an inactive state corresponds to a preset pattern, and the angle of the body 100 is inclined more than a preset angle.

In addition, when sensing that the angle of the body 100 is inclined at a preset angle, the controller 180 can execute a function linked with the angle of the body 100. For example, as illustrated in FIGS. 4A(b) and 4A(c), when sensing that the angle of the body 100 is inclined more than a preset angle, the controller 180 can activate the front camera 121*a*. In other words, when the angle of the body 100 is inclined more than a preset angle, the controller 180 can determine that the user has an intention to capture his or her own shape, and activate the front camera 121*a* to receive an image from the front camera.

Further, the front camera 121*a* may denote a camera disposed on a front surface of the body 100. For reference, a camera disposed on a front surface of the body 100 is named as a "front camera 121*a*" and a camera disposed on a rear surface of the body 100 as a "rear camera 121*b*", and the term "camera 121" is used when it is applicable both to the front and rear camera.

In another example, as shown in FIGS. 4(*a*)-(*c*), when the controller 180 senses the pattern formed with the plurality of taps applied while the display unit 151 is in an inactive state corresponds to the preset pattern, and when the angle of the body 100 is not inclined more than a preset angle, the controller 180 can activate the rear camera 121*b*. In other words, when the angle of the body 100 is not inclined more than a preset angle, the controller 180 can determine that the user has an intention to capture an image located at the front side, and activate the rear camera 121*b* to receive an image from the rear camera 121*b*.

In the above, a method of executing a different function according to the state of the body when a pattern formed with a plurality of taps applied while the display unit is in an inactive state corresponds to a preset pattern has been described. Thus, the user can execute various functions using various control commands without performing an additional command for activating the display unit 151.

Figure 5A:
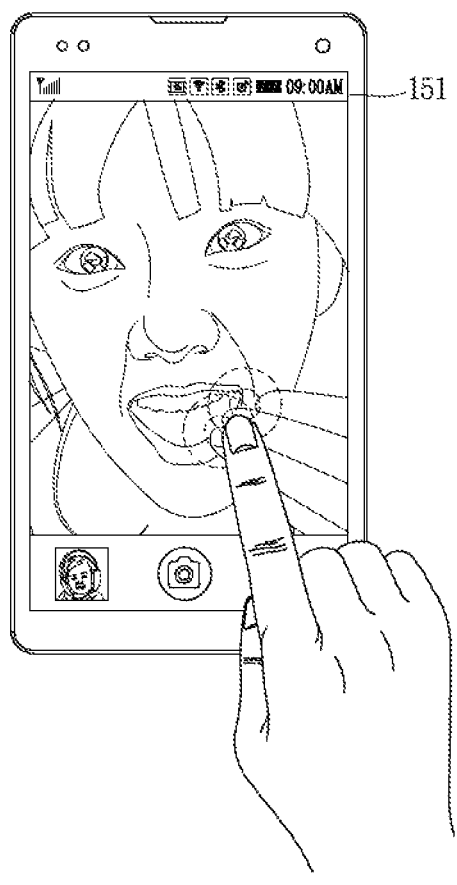
FIGS. 5A(a) to (b), 5B(a) to (e) and 5C(a) to (e) are conceptual views illustrating a method of matching a pattern formed with a plurality of taps applied when the display unit is in an inactive state to a specific person's identification information.
Figure 5A:
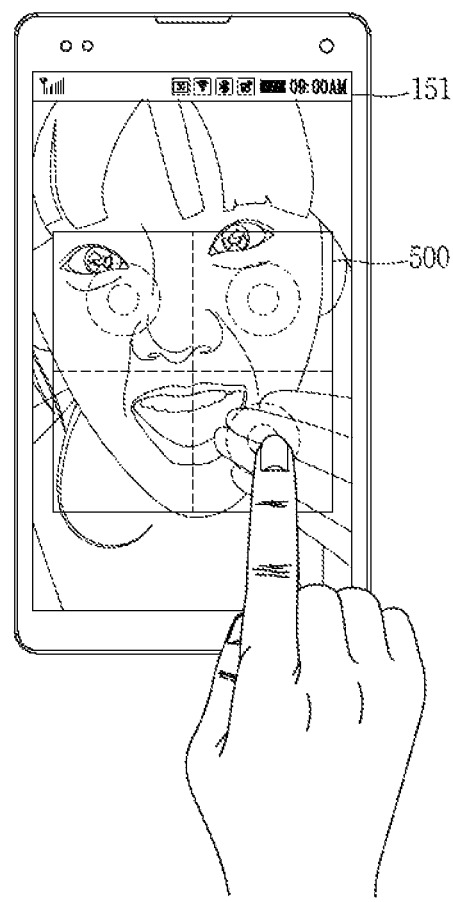
Figure 5B:
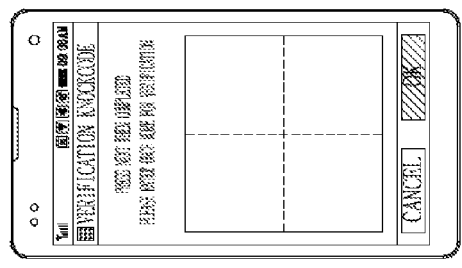
Figure 5B:
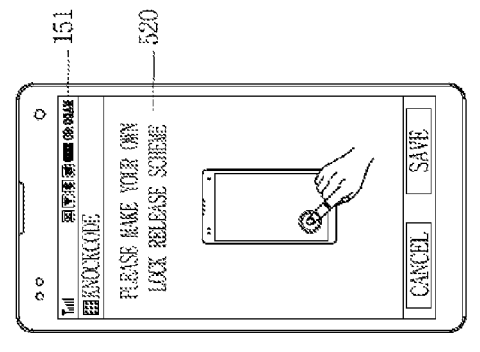
Figure 5B:
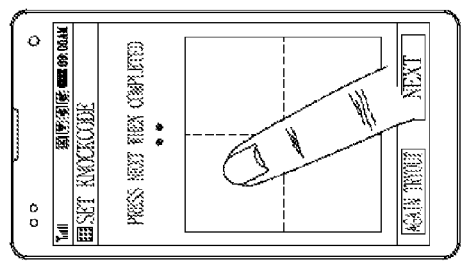
Figure 5B:
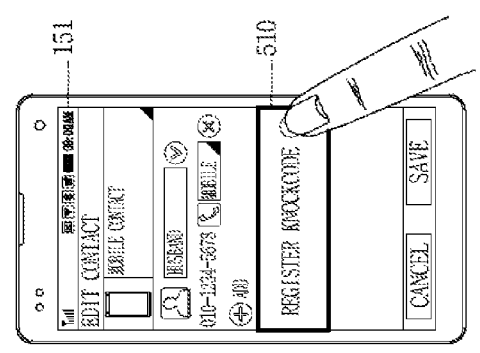
Figure 5B:
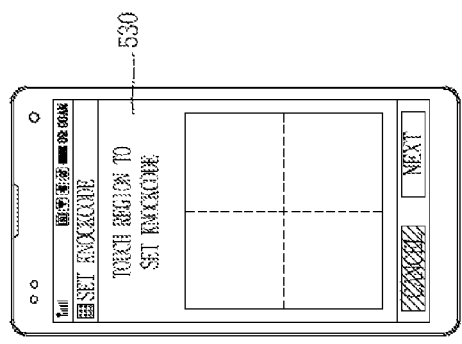

Hereinafter, when a preset pattern matches a specific person's identification information will be described. FIGS. 5A to 5C are conceptual views illustrating a method of matching a pattern formed with a plurality of taps applied when the display unit 151 is in an inactive state to a specific person's identification information. In addition, FIGS. 6A to 6E are conceptual views illustrating a control method when a preset pattern matched to the specific person's identification information is applied, and FIGS. 7A to 7F are conceptual views illustrating a control method when a pattern matched to the specific person's identification information is applied and then an additional condition is satisfied.

A mobile terminal according to an embodiment of the present invention can match a pattern to a specific person's identification information. Further, the specific person's identification information may include various information associated with a specific person such as phone number information, name information, address book information, email information, face recognition information, and the like.

Further, the mobile terminal can match a pattern to the specific person's identification information through various methods. For example, as illustrated in FIG. 5A, the user can apply a plurality of tap inputs when a specific person's image is displayed on the display unit 151. For example, as illustrated in FIG. 5A(a), the user can apply a double tap input.

In addition, upon sensing the plurality of tap inputs, the controller 180 can display screen information 500 for matching a pattern to a specific person's identification information indicated by the image. For example, as illustrated in FIG. 5A(b), upon sensing the plurality of tap inputs, the controller 180 can display a setting screen 500 for setting a pattern to be overlapped on the specific person's image.

When the user enters a pattern using the setting screen 500 for setting the pattern, the controller 180 can store pattern matching information in which the specific person's identification information matches the input pattern in the memory unit 170. In another example, the mobile terminal can match a pattern to the specific person's identification information using a function of setting contact information previously existed. In addition, the function of setting contact information may further include an item indicating a function of matching a pattern to a specific person's identification information.

More specifically, as illustrated in FIG. 5B(a), when a function of setting contact information is performed, the controller 180 can display an item indicating a function of matching a specific person's identification information to a pattern (hereinafter, the item is referred to as "register knockcode" 510) in one region of the display unit 151.

As illustrated in FIG. 5B(c), when the item "register knockcode" 510 is selected, the controller 180 can display screen information 530 for setting a pattern. Further, when determining that the function of matching a specific person's identification information to a pattern is initially used, the controller 180 can additionally provide description screen information 520 illustrating the function of matching a specific person's identification information to a pattern. For example, as illustrated in FIG. 5B(b), the controller 180 can provide the description screen information 520, thereby allowing the user to easily recognize the function.

Then, as illustrated in FIGS. 5B(d) and 5B(e), upon receiving a pattern from the user using the screen information for setting a pattern, the controller 180 can store pattern matching information in which the specific person's identification information matches the pattern in the memory unit 170. Furthermore, according to an embodiment of the present invention, the controller 180 can match a user's gesture to a specific person's identification information as well as a pattern to a specific person's identification information.

For example, as illustrated in FIG. 5C(a)-(c), when an item of register motion is selected, the controller 180 can activate the camera to receive a gesture from the user. Further, the motion and gesture are used herein to have the same meaning.

Then, as illustrated in FIG. 5C(d) and (e), the controller 180 can allow the user to select a function linked with the gesture. In the above, a method of setting a pattern and a gesture to a specific person's identification information has been described. Thus, the user can easily match the pattern and gesture to a specific person's identification information.

Hereinafter, a method of using pattern matching information in which the specific person's identification information matches a pattern will be described. When a pattern formed with a plurality of taps applied while the display unit 151 is in an inactive state corresponds to a pattern matched to a specific person's identification information, the controller 180 can execute a function using the specific person's identification information. In other words, an embodiment of the present invention can match a function associated with a specific person to the pattern, thereby quickly executing the function.

In addition, when there are a plurality of functions linked with the specific person's identification information, the controller 180 can execute any one of the plurality of functions based on a preset condition. Further, the preset condition may be a condition associated with the state of the body. For example, as illustrated in FIG. 6A(a), a specific person's identification information (for example, "husband") can be matched to a pattern formed with a plurality of taps applied when the display unit 151 is in an inactive state.

In addition, the controller 180 can sense the state of the body. Further, the state of the body can be sensed by various sensors such as a proximity sensor, a gravity sensor, a motion sensor, and the like provided in the mobile terminal. For example, as illustrated in FIG. 6A(b), when an object is sensed within a preset range based on the body using a proximity sensor, the controller 180 can determine that the user is currently making a gesture for making a call.

Figure 6A:
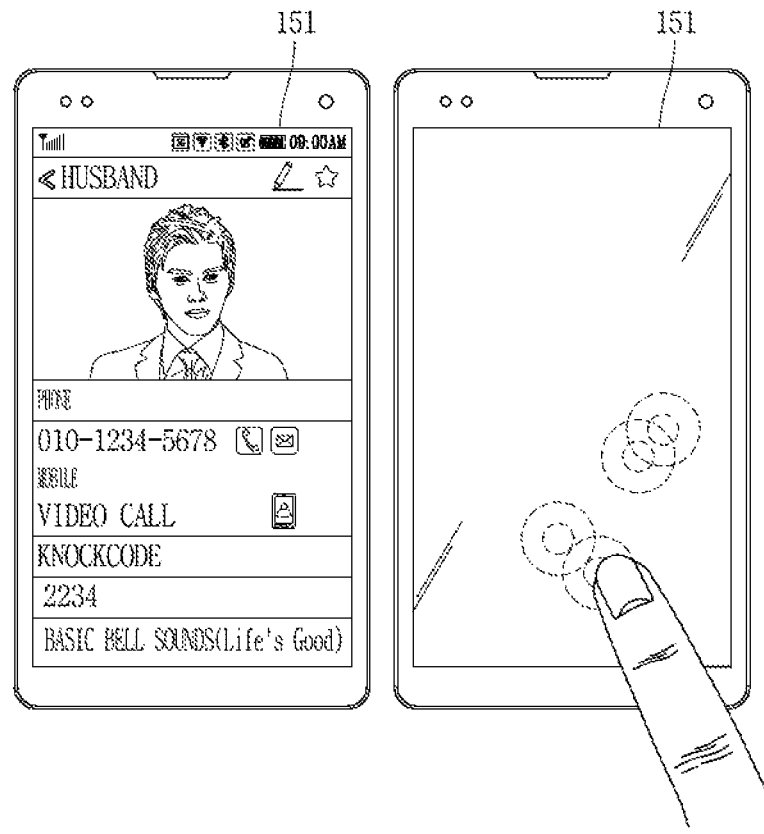
FIGS. 6A(a) to (c), 6B(a) to (c), 6C(a) to (c), 6D(a) to (c) and 6E(a) to (c) are conceptual views illustrating a control method when a preset pattern matched to the specific person's identification information is applied.
Figure 6A:
Figure 6A:
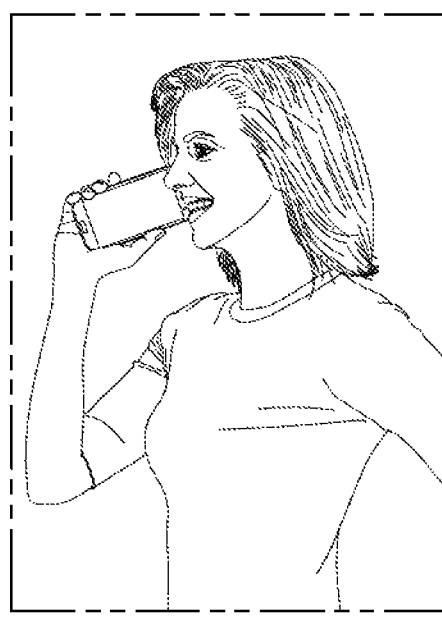

In addition, as illustrated in FIG. 6A(c), the controller 180 can perform a function of making a call to an external terminal indicated by the specific person's identification information based on the sensed state of the body. In other words, the user can immediately perform a call to a specific person using a pattern and gesture matched to a specific person's identification information even when the display unit 151 is not in an inactive state.

In another example, the controller 180 can sense a preset movement of the body. In addition, the controller 180 can perform a call to an external terminal indicated by a specific person's identification information. For example, as illustrated in FIG. 6B(b), the controller 180 can sense the body being tilted in a preset direction.

Figure 6B:
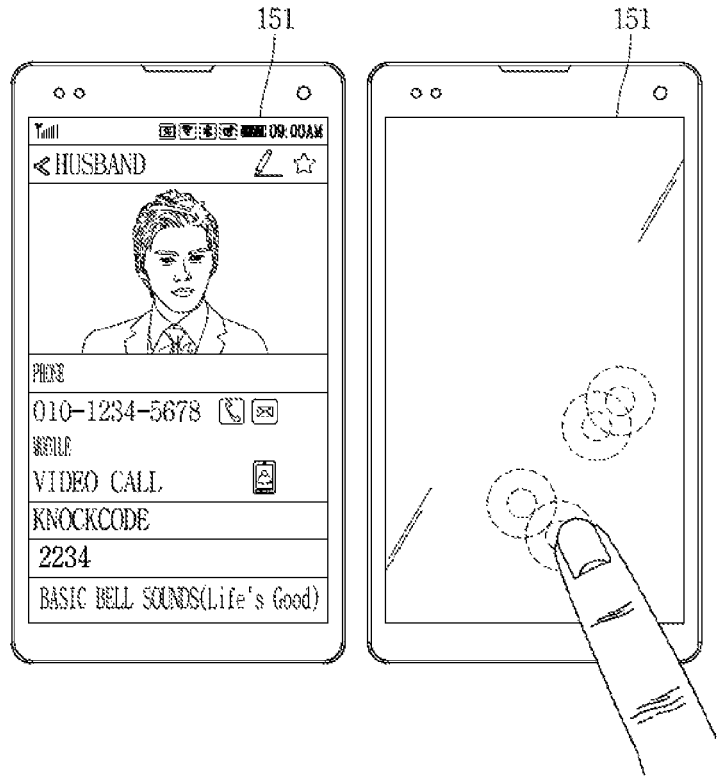
Figure 6B:
Figure 6B:
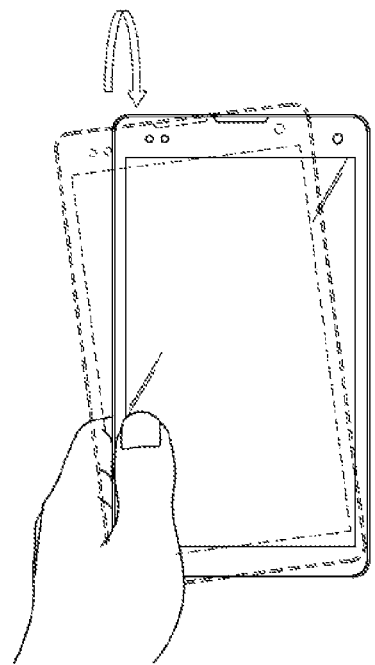

Upon sensing a movement being tilted in the preset direction, as illustrated in FIG. 6B(c), the controller 180 can perform a function of making a call to an external terminal indicated by a specific person's identification information matched to the preset pattern. In another example, when a preset type of touch is applied to the body, the controller 180 can perform a function of transmitting a message to an external terminal indicated by a specific person's identification information matched to the preset pattern. More specifically, as illustrated in FIG. 6C(a), a pattern matched to the specific person's identification information (for example, "husband") may be sensed.

Figure 6C:
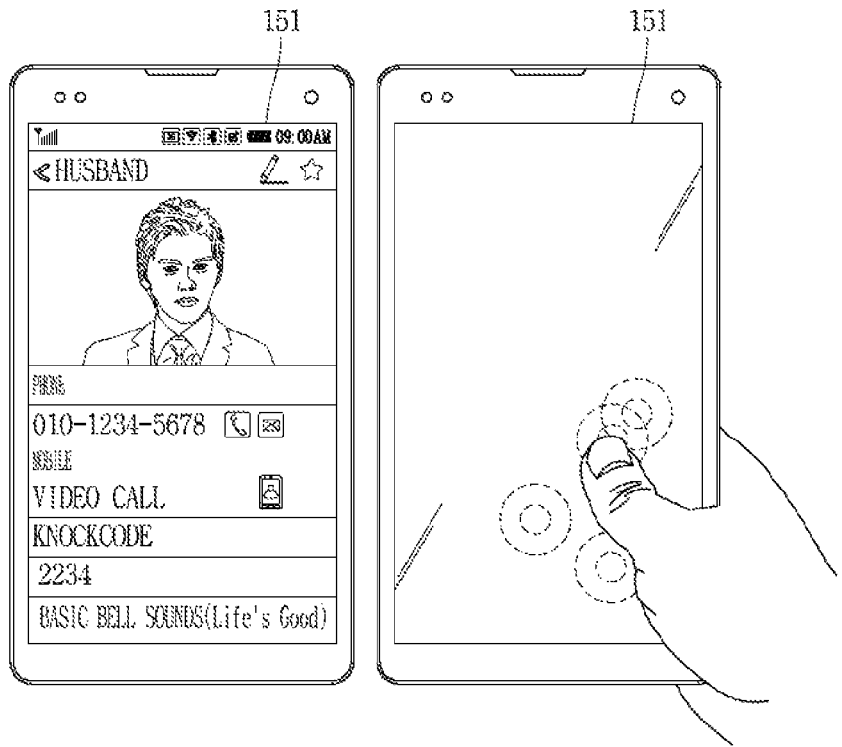
Figure 6C:
Figure 6C:
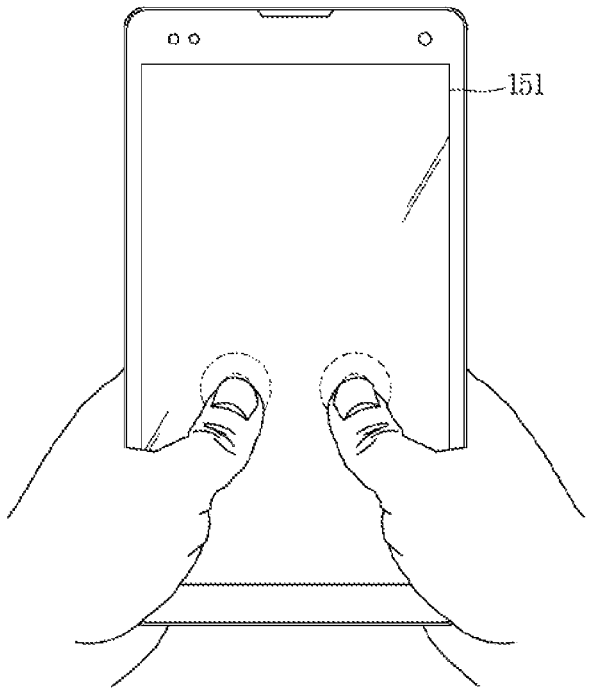

Then, as illustrated in FIG. 6C(b), the user can apply an touch to at least two positions at the same time when the display unit 151 is in an inactive state. In this instance, as illustrated in FIG. 6C(c), the controller 180 can perform a function of transmitting a message using the specific person's identification information based on a touch applied to at least two positions.

Figure 6D:
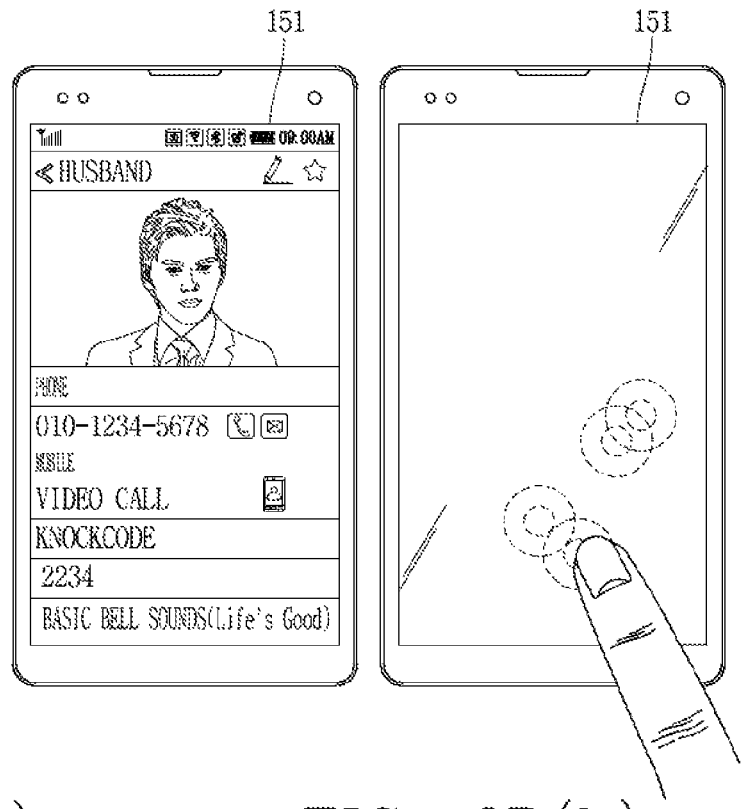
Figure 6D:
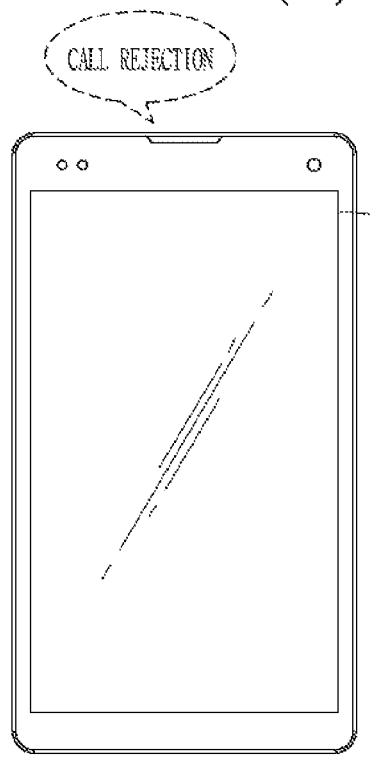
Figure 6D:
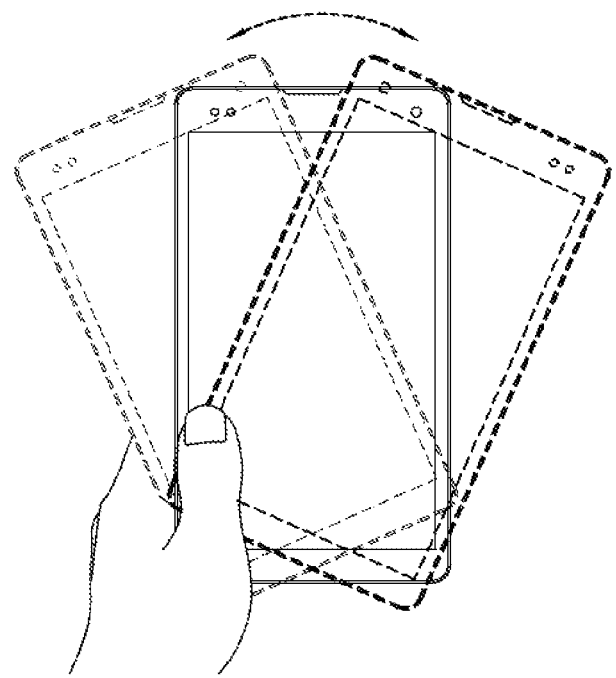

In another example, the controller 180 can perform a function of rejecting the reception of a call received from the specific person's identification information. More specifically, as illustrated in FIG. 6D(a), a pattern matched to the specific person's identification information (for example, "husband") may be sensed. In addition, as illustrated in FIG. 6D(b), the controller 180 can sense the movement of horizontally shaking the body after the plurality of taps shown in FIG. 6D(a).

In addition, as illustrated in FIG. 6D(c), using the identification information of a specific person matched to a pattern formed with a plurality of taps applied prior to the shaking movement, when a call signal is received from an external terminal corresponding to identification information, the controller 180 can perform a function of rejecting the call signal. In other words, when a call signal is received from an external terminal corresponding to the identification information, the controller 180 can ignore the call signal.

Moreover, the controller 180 can set a period of time for ignoring the call signal based on a frequency of the shaking movement. For example, the controller 180 can ignore a call signal coming from an external terminal indicated by the specific person's identification information for two hours when the movement of shaking the body is sensed twice, and ignore a call signal coming from an external terminal indicated by the specific person's identification information for three hours when the movement of shaking the body is sensed three times.

Furthermore, when the movement of shaking the body is greater than a preset shaking frequency, the controller 180 can ignore a call signal coming from an external terminal indicated by the specific person's identification information until it is released by the user. More specifically, the controller 180 can suspend the reception of a call signal being received. In other words, the controller 180 can no longer receive the reception of a call signal being received.

Furthermore, the controller 180 can perform a different function according to a direction of the movement of shaking the body. For example, the controller 180 can perform a function of suspending a function of ignoring the reception of the call signal upon sensing the movement of shaking the body in a forward and backward direction, and perform a function of not displaying the notification information of the call signal upon sensing the movement of shaking the body in a left and right direction.

In another example, when a pattern matched to a specific person's identification information is applied, the controller 180 can detect image information tagged with the specific person's identification information to play the image. Further, an image being tagged with identification information may be construed to have a meaning that link information linked between an image and the identification information is stored in the memory unit 170.

More specifically, as illustrated in FIGS. 6E(a) and 6E(b), when sensing that a pattern matched to the specific person's identification information is applied, and the body is changed into a horizontal mode, the controller 180 can extract an image to be played using the specific person's identification information. Then, as illustrated in FIG. 6E(c), the controller 180 can display the extracted image.

In the above, a method of performing a different function according to the movement of the body subsequent to applying a pattern matched to a specific person's identification information has been described. Hereinafter, a method of performing a different function when a preset gesture is sensed subsequent to applying a pattern matched to a specific person's identification information will be described.

When a pattern matched to a specific person's identification information is applied, the controller 180 can activate the front camera 121*a* to detect a gesture being received from the user. In addition, notification information indicating that a front camera is currently being activated may be displayed on the display unit 151. In addition, the activated front camera 121*a* may be activated only when the last tap of the plurality of patterns is maintained, and deactivated when the last tap is not maintained.

Upon recognizing a gesture through the front camera 121*a*, the controller 180 can perform a preset function to the gesture. Further, the preset function may be all executable functions in the mobile terminal. For example, when a pattern matched to a specific person's identification information is applied and a preset type of gesture is sensed, the controller 180 can change the setting value of the mobile terminal to a setting value set to the specific person.

Further, setting value information set to the specific person may be a preset value. Furthermore, the setting value of the mobile terminal may be a setting value associated with a fundamental function of the mobile terminal such as an output mode setting value of the mobile terminal, an ON/OFF setting value of GPS, an ON/OFF setting value of the wireless communication unit, and the like.

More specifically, referring to FIGS. 7A(a) and (b), the controller 180 can sense the plurality of taps and then a user's gesture through the front camera. Then, when the gesture is sensed, the controller 180 can change the setting value of the mobile terminal to a setting value set to the specific person using the specific person's identification information. For example, as illustrated in FIG. 7A(c), the controller 180 can change the setting value of the mobile terminal to a setting value set to the specific person, namely, wireless communication unit ON 720*c*, Q memo function ON 720*a*, and rotation function ON 720*e*. At the same time, the controller 180 can change the setting value of the mobile terminal to sound notification ON 720*b* and GPS function ON 720*d*.

Figure 7B:
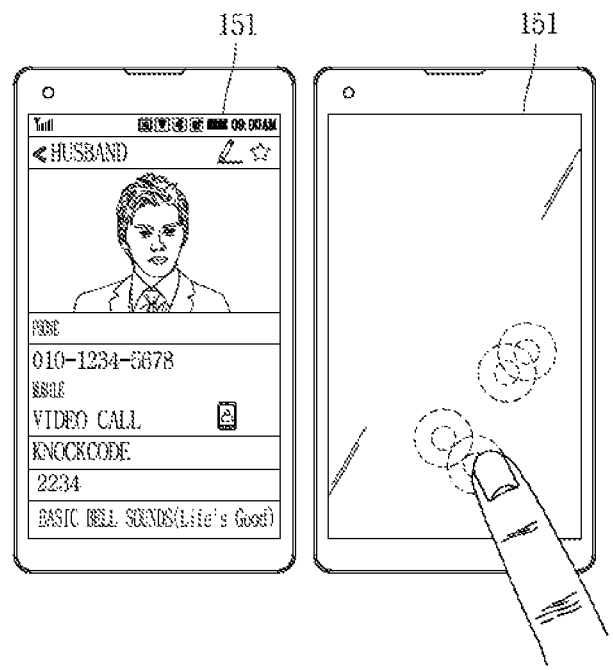
FIGS. 7A(a) to (c), 7B(a) to (c), 7C(a) to (c), 7D(a) to (c), 7E(a) to (c) and 7F(a) to (c) are conceptual views illustrating a control method when a pattern matched to the specific person's identification information is applied and then an additional condition is satisfied.
Figure 7B:
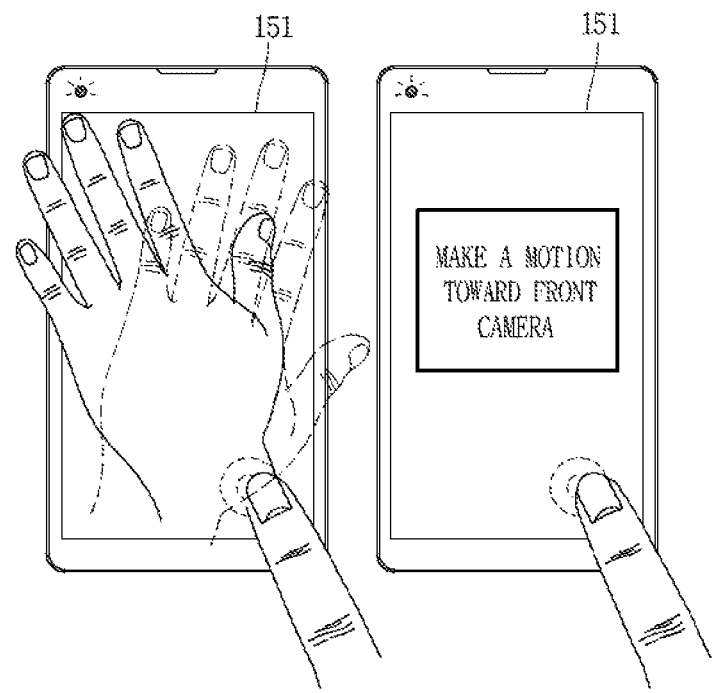
Figure 7B:
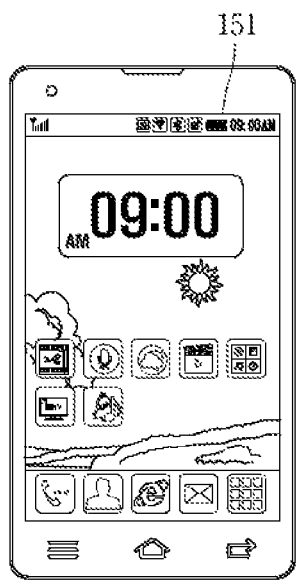

In another example, referring FIGS. 7B(a) through 7B(c), the controller 180 can enter an operation mode in which executable functions are restricted according to a specific person's identification information. For example, when a user gesture is applied subsequent to applying a pattern matched to the identification information of a "son", the controller 180 can enter an operation mode for allowing only executable functions by the "son" to be operated.

Figure 7C:
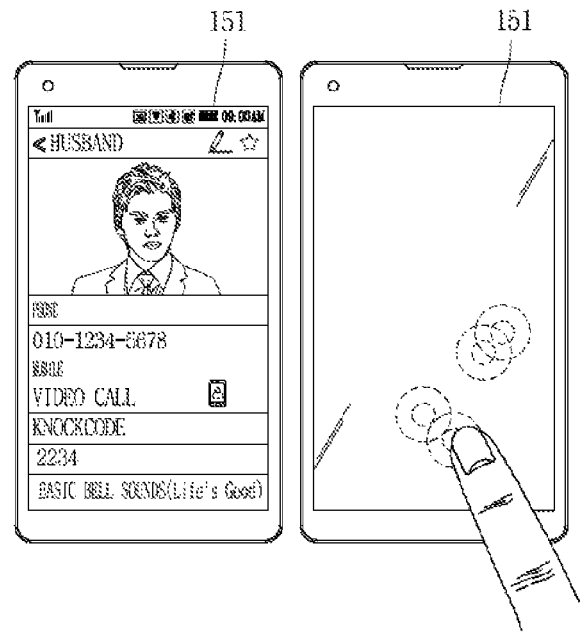
Figure 7C:
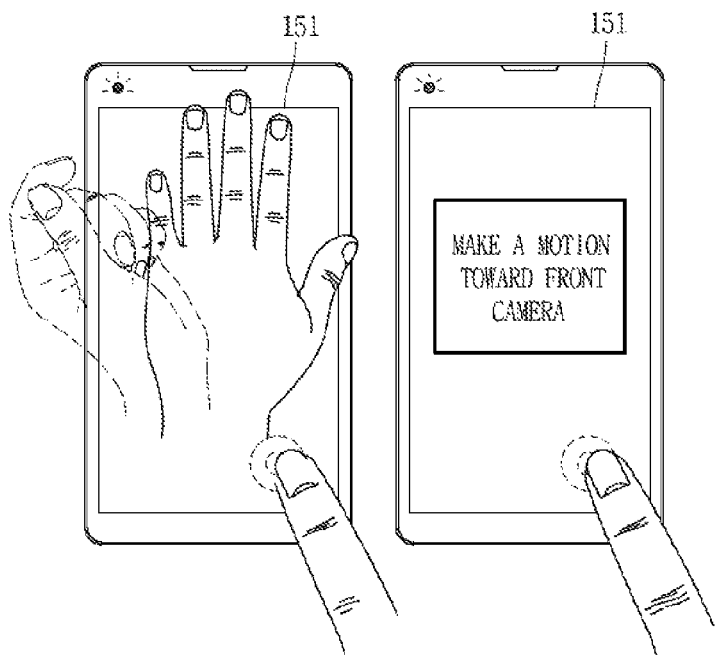
Figure 7C:
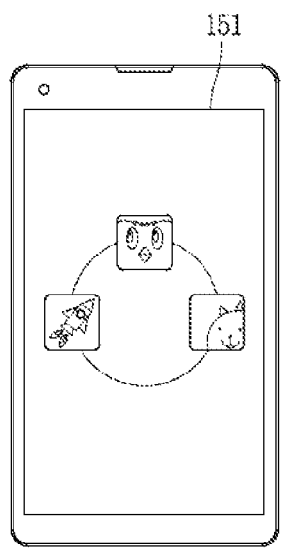

In still another example, as illustrated in FIGS. 7C(a) through 7C(c), the controller 180 can display graphic objects indicating at least one function linked with a specific person's identification information in one region of the display unit 151 without entering the specific operation mode. Further, the at least one function linked with a specific person's identification information may be a function frequently used by a specific person. In this instance, the user can immediately execute a function indicated by the graphic objects using the displayed graphic objects.

Figure 7D:
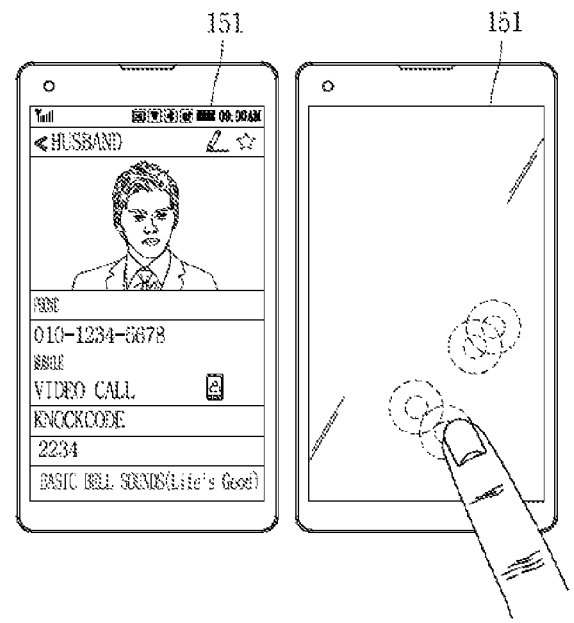
Figure 7D:
Figure 7D:
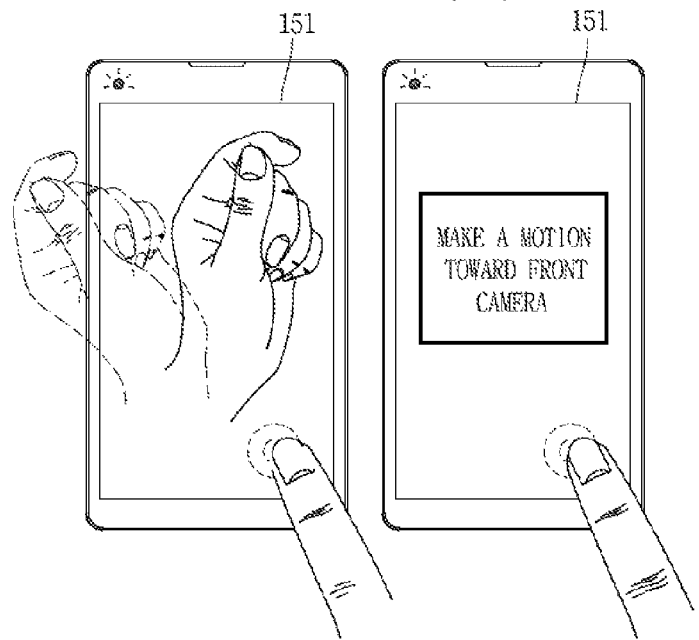

In yet still another example, as illustrated in FIGS. 7D(a) through 7D(c), when the gesture is applied, the controller 180 can immediately perform a function linked with the specific person's identification information, and display screen information indicating the function on the display unit 151.

In the above, a method of performing a specific function by applying a pattern matched to a specific person's identification information and then applying a gesture has been described. Hereinafter, a method of performing a specific function based on sensing the body connected to an external device will be described.

When sensing that the body is connected to an external device subsequent to applying a plurality of taps corresponding to a pattern matched to a specific person's identification information while the display unit 151 is in an inactive state, the controller 180 can perform a function linked with the state of the body using the specific person's identification information based on the connection with the external terminal.

Figure 7E:
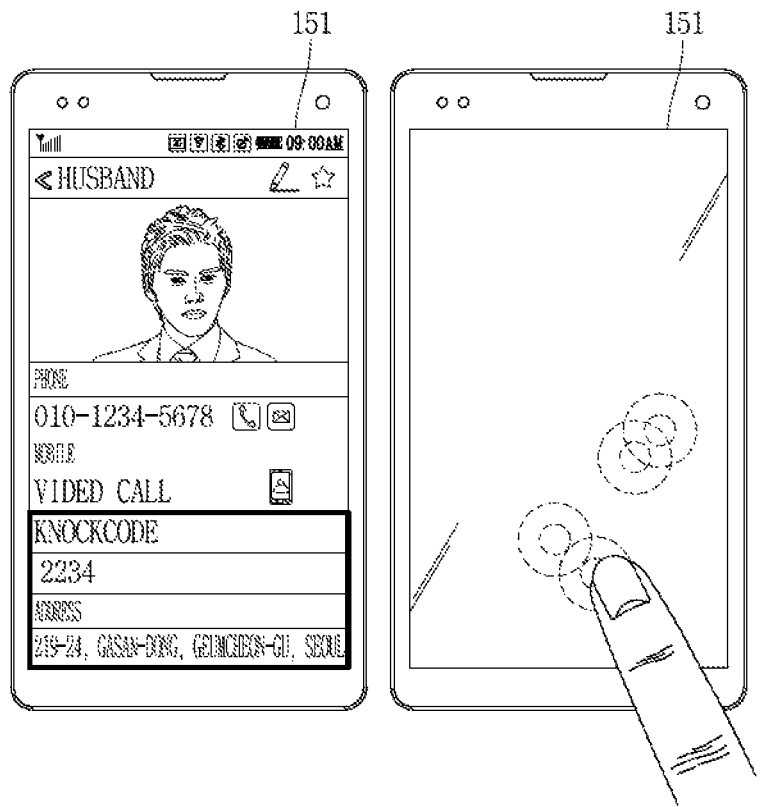
Figure 7E:
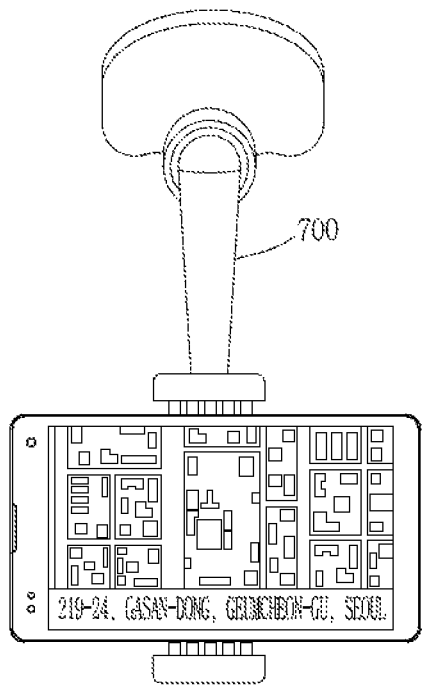
Figure 7E:
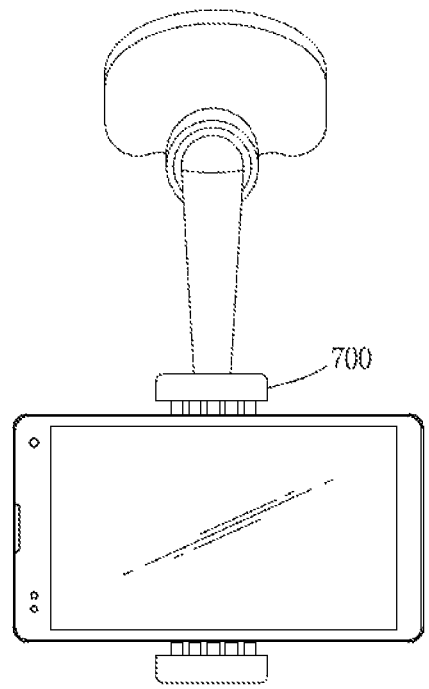

For example, as illustrated in FIG. 7E(a), the controller 180 can sense a pattern matched to the identification information of a specific person (for example, "husband") while the display unit 151 is in an inactive state. Then, the controller 180 can sense that the body has been mounted on an external device as shown in FIG. 7E(b). Further, the external device may be a vehicle terminal dock 700. Thus, the mobile terminal may further include a magnetic sensor. More specifically, the controller 180 can determine whether or not the body is currently connected to the vehicle terminal dock 700.

When determined that the body is mounted on an external device, the controller 180 can execute a function linked with the state of being mounted on the external device. For example, as illustrated in FIG. 7E(c), the function linked with the state of being mounted on the external device may be a navigation function for performing path finding.

In addition, when executing the function linked with the state of being mounted on the external device, the controller 180 can use a specific person's identification information. More specifically, during the execution of the navigation function, the controller 180 can execute the path finding function using the address book information of the husband as its destination information.

Figure 7F:
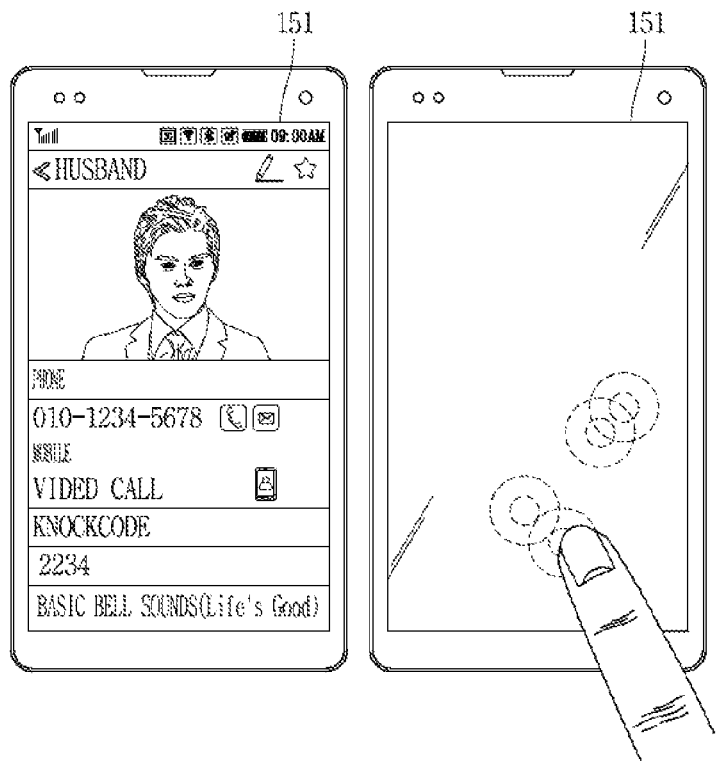
Figure 7F:
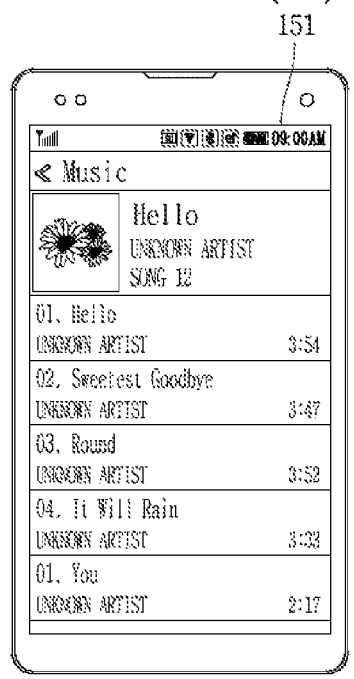
Figure 7F:
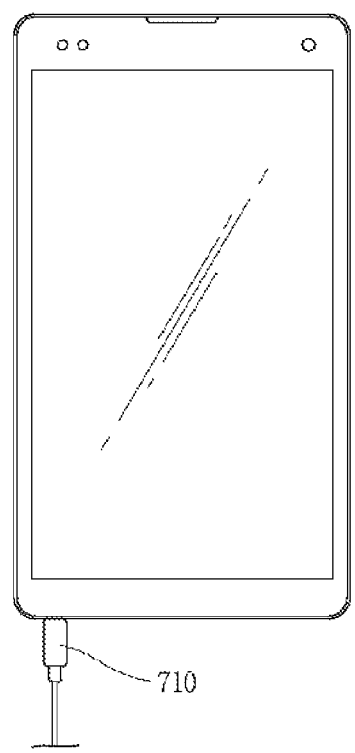

In still another example, the controller 180 can sense that the body is connected to an external device. For example, as illustrated in FIG. 7F(b), the controller 180 can sense that an earphone 710 is connected thereto. In this instance, as illustrated in FIGS. 7F(b) and 7F(c), as described above, the controller 180 can execute a music play application linked with the connecting state of the earphone 710, and moreover, set a type of played music using the specific person's identification information.

In the above, a method of controlling a case that a pattern formed with a plurality of taps applied while the display unit 151 is in an inactive state matches a specific person's identification information has been described. Thus, a method of quickly performing a function associated with a specific person is provided.

Figure 8A:
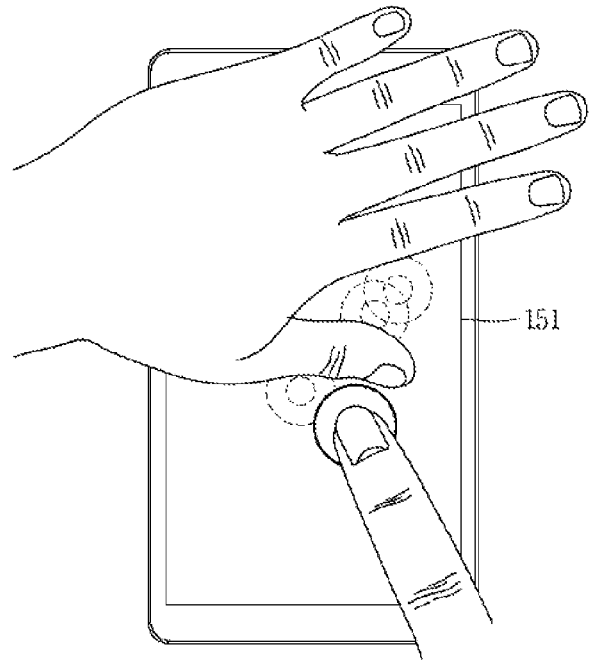
FIGS. 8(*a*) to (*c*) are a conceptual view illustrating a control method when a pattern formed with a plurality of taps is sensed when at least part of the display unit is hidden.
Figure 8C:
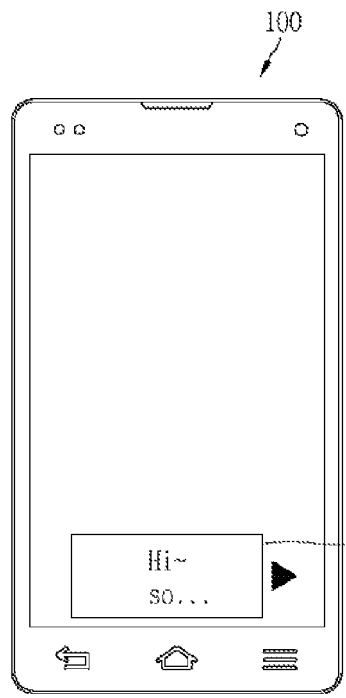
Figure 8B:
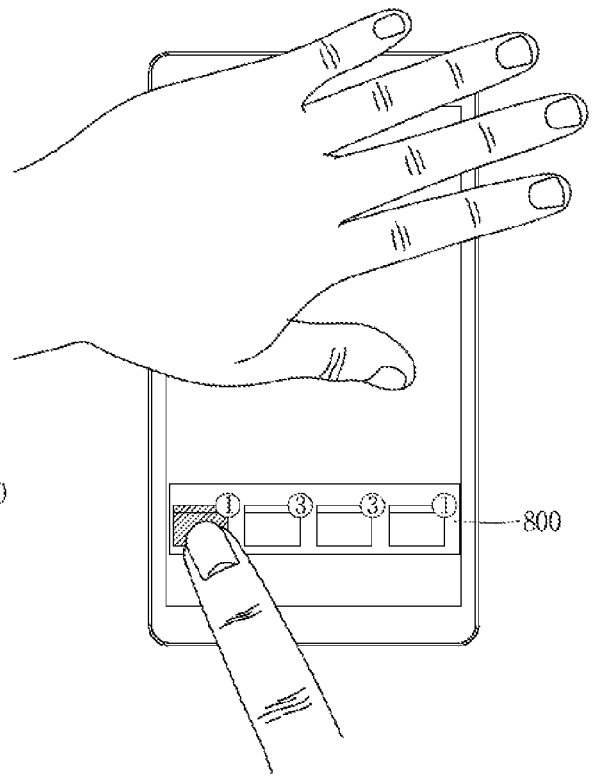

Hereinafter, a method of controlling a pattern formed with a plurality of taps when at least part of the display unit is hidden will be described. FIG. 8 is a conceptual view illustrating a control method when a pattern formed with a plurality of taps is sensed when at least part of the display unit is hidden.

In more detail, the mobile terminal according to an embodiment of the present invention may further include a proximity sensor for sensing the presence or absence of an object on a front surface of the display unit 151. The controller 180 can sense that at least part of the deactivated display unit 151 is hidden by an object through the proximity sensor while the display unit 151 is in an inactive state.

As illustrated in FIG. 8(*a*), the user can apply a plurality of taps to the remaining region other than the at least part thereof that is hidden by an object (e.g., their hand). In addition, when the pattern formed with a plurality of taps corresponds to a preset pattern, the controller 180 can display notification information 800 associated with an event that has occurred on the mobile terminal in the remaining region as shown in FIG. 8(*b*). For example, the notification information may be information on a message received from an external terminal, schedule notification information, and the like. In other words, the controller 180 can activate the display unit 151 for only the remaining region that is not hidden to provide simple notification information to the user.

Moreover, as illustrated in FIG. 8(*c*), the controller 180 can check the content 810 of the notification information based on the selection of the notification information. Thus, an embodiment of the present invention can detect a region other than a region in which the display unit 151 is hidden, and provide information to the user using the non-hidden region.

Figure 9A:
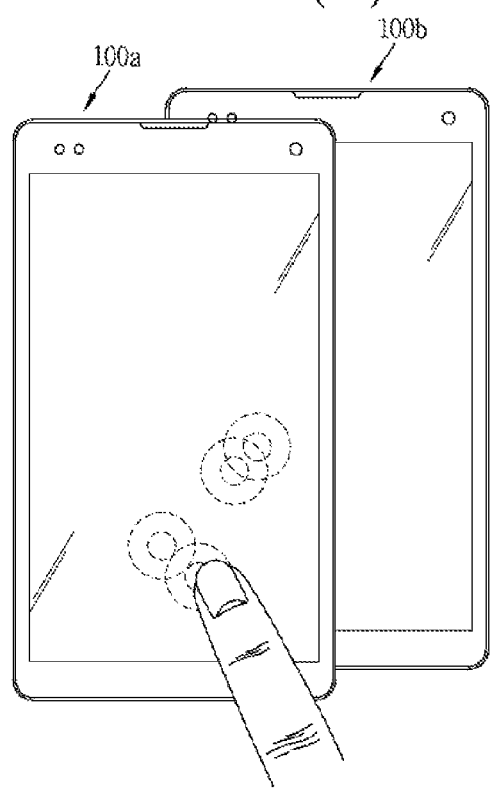
FIG. 9(*a*) to (*c*) are a conceptual view illustrating a method of transmitting information to an external terminal when the display unit is in an inactive state.
Figure 9B:
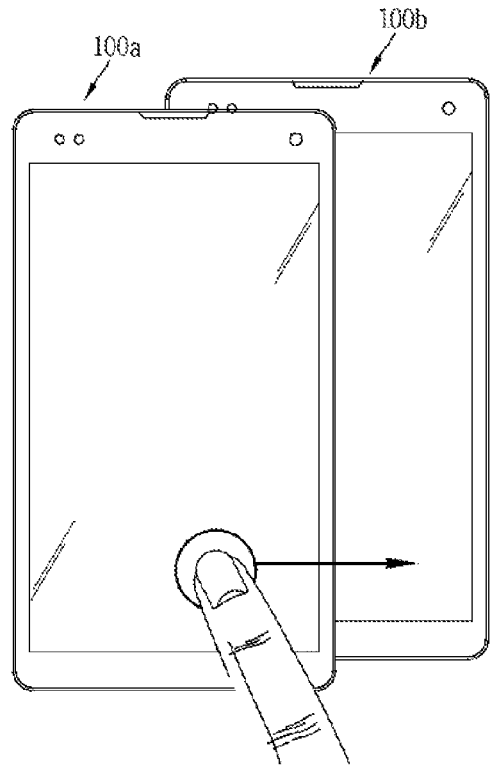
Figure 9C:
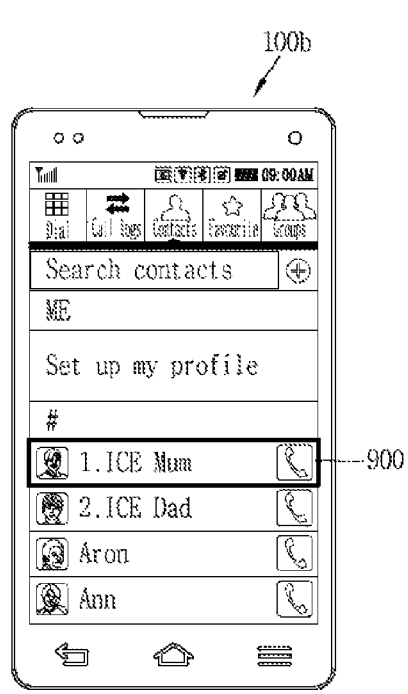

Hereinafter, a method of transmitting information to an external terminal when the display unit is in an inactive state will be described. FIG. 9 is a conceptual view illustrating a method of transmitting information to an external terminal when the display unit is in an inactive state. The mobile terminal 100*a* according to an embodiment of the present invention may further include a server communication unit for performing communication in a wireless manner with the external terminal 100*b*. Further, the wireless communication unit may perform an NFC-type communication that performs short-range communication.

Upon sensing a pattern corresponding to the preset pattern when facing the external terminal 100*b*, the controller 180 can transmit information linked with the pattern in a wireless manner to the external terminal 100*b*. For example, as illustrated in FIG. 9(*a*), the controller 180 can sense a plurality of taps corresponding to a preset pattern when facing the external terminal 100*b*. Then, as illustrated in FIG. 9(*b*), when a drag input consecutive from the last tap among the plurality of taps is applied, the controller 180 can transmit information linked with the preset pattern to the external terminal 100*b*. For example, as illustrated in FIG. 9(*c*), the information linked with the preset pattern can be contact information 900.

Thus, information can be transmitted to an external terminal while maintaining the inactive state of the display unit 151. That is, the user can transmit specific information to an external terminal without activating the display unit.

Figure 10A:
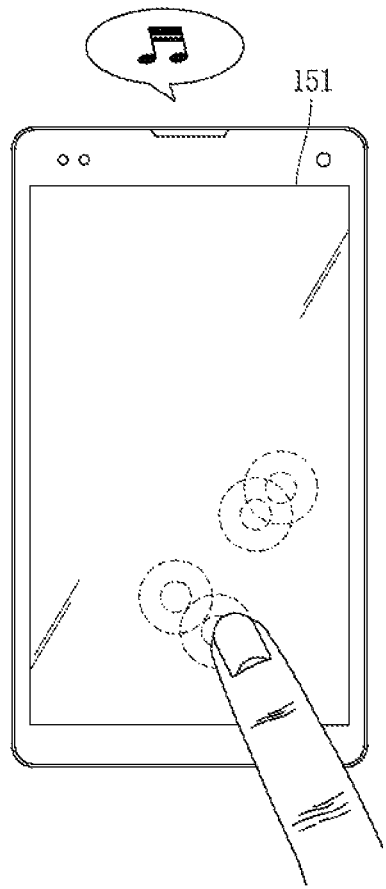
FIGS. 10A(a) to (b) and 10B(a) to (c) are conceptual views illustrating a method of controlling a currently executed function based on a plurality of taps being sensed when the display unit is in an inactive state.
Figure 10A:
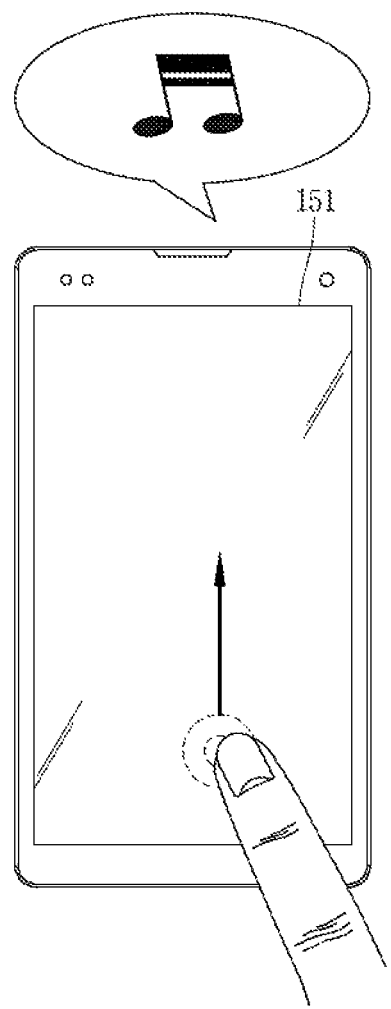
Figure 10B:
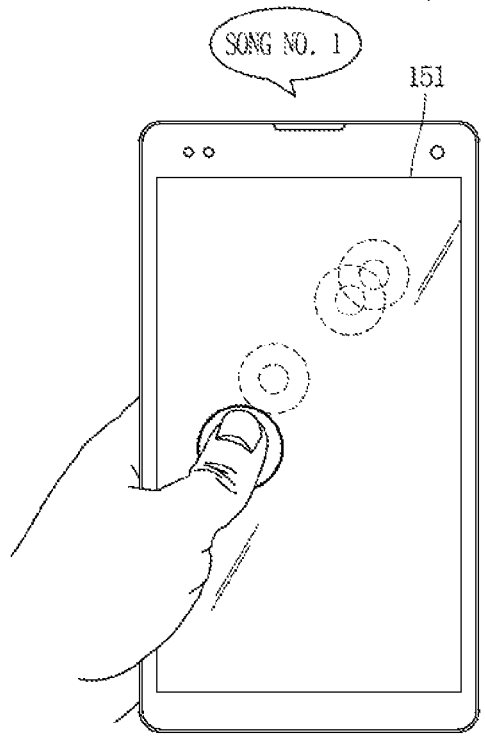
Figure 10B:
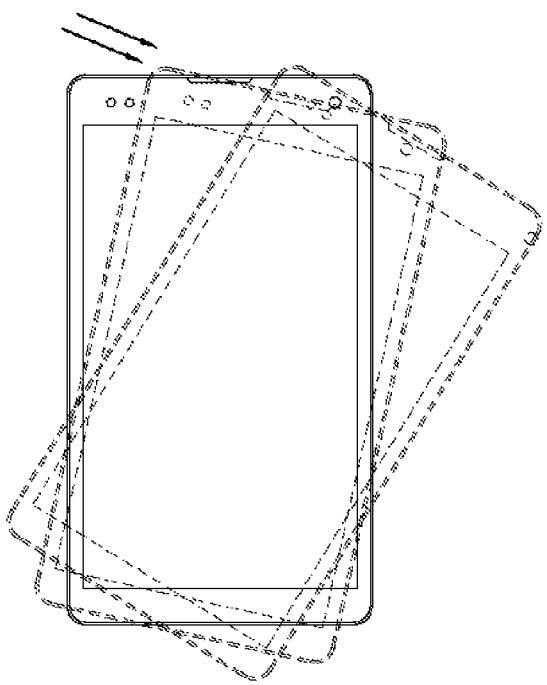
Figure 10B:
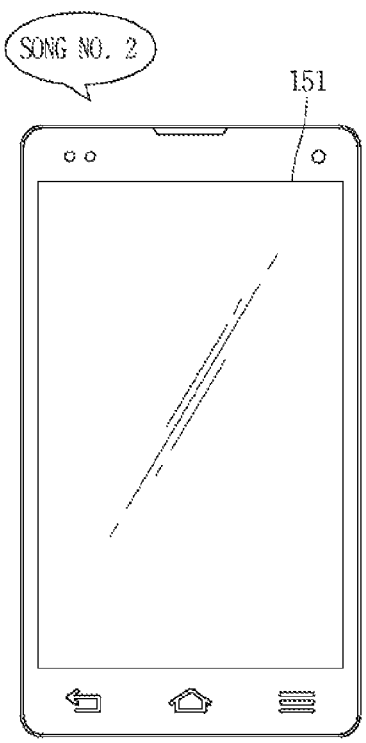

Hereinafter, a method of controlling a currently executed function based on a plurality of taps being sensed when the display unit is in an inactive state. FIGS. 10A and 10B are conceptual views illustrating a method of controlling a currently executed function based on a plurality of taps being sensed when the display unit is in an inactive state.

According to a mobile terminal according to an embodiment of the present invention, a specific application may be being executed even when the display unit 151 is in an inactive state. For example, according to the mobile terminal, an application associated with playing music may be being executed. In addition, the application being executed even when the display unit 151 is in an inactive state may be an application that does not require the activation of the display unit 151.

Further, when a pattern formed with a plurality of taps applied while the display unit 151 is in an inactive state corresponds to a preset pattern, the controller 180 can control a function currently being executed in the mobile terminal using a tap that has been finally applied among the plurality of taps. More specifically, the insulating pin 280 may control a function currently being executed in the mobile terminal using a drag input consecutive to the last tap with respect to the last tap of the plurality of taps.

For example, as illustrated in FIG. 10A(*a*), an application performing a music play function may be currently executed in the mobile terminal. According to an embodiment, the user can apply a plurality of taps to the display unit 151 while maintaining the inactive state of the display unit 151. In addition, the controller 180 can control an application indicating the music play function based on a pattern formed with the plurality of taps corresponding to a preset pattern and a drag input consecutive to a tap that has been finally applied among the plurality of taps.

In addition, the controller 180 can perform various controls based on the direction of the drag input. For example, a left and a right drag input may correspond to a previous music play function and a next music play function, respectively, and a vertical drag input may correspond to a volume adjustment function. For example, as illustrated in FIG. 10A(*b*), the controller 180 can control a volume of the music play application currently being executed based on the drag input.

In another example, the controller 180 can control a currently executed application using a movement of the body subsequent to applying the plurality of taps. For example, as illustrated in FIG. 10B(*b*), the controller 180 can sense the movement of horizontally shaking the body.

In this instance, the controller may control the function of the application based on the movement of the body. For example, as illustrated in FIG. 10B(*c*), the controller 180 can control a previous music play and a next music play function of the music currently being executed.

Thus, the user can control an application being executed in the mobile terminal even while maintaining the inactive state of the display unit 151. Thus, the user's convenience is enhanced.

Hereinafter, a method of executing various functions based on a plurality of taps sensed when the display unit 151 is in an inactive state and the state of the body. FIGS. 11A to 11F are conceptual views illustrating a method of executing various functions based on a plurality of taps sensed when the display unit is in an inactive state and the state of the body.

When a pattern formed with a plurality of taps applied while the display unit 151 is in an inactive state corresponds to a preset pattern, the controller 180 can determine the state of the body. Then, the controller 180 can execute a function linked with the state of the body based on the state of the body.

Figure 11A:
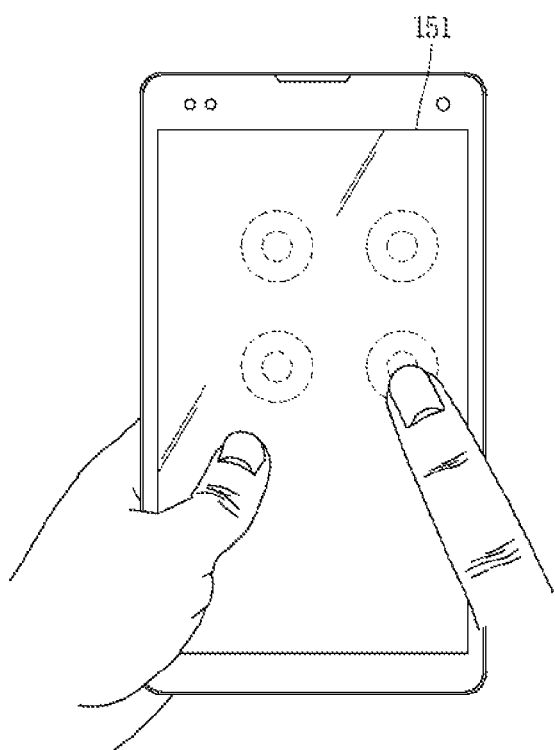
FIGS. 11A(a) to (b), 11B(a) to (c), 11C(a) to (c), 11D(a) to (b), 11E(a) to (b) and 11F(a) to (d) are conceptual views illustrating a method of executing various functions based on a plurality of taps sensed when the display unit is in an inactive state and the state of the body.
Figure 11A:
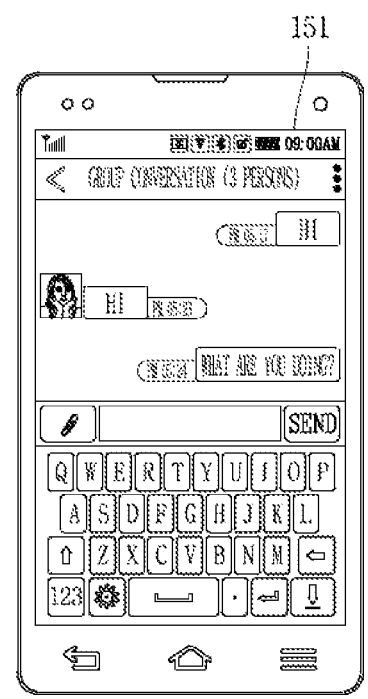

For example, as illustrated in FIG. 11A(*a*), the controller 180 can sense a touch being applied to a specific region of the body when the plurality of taps are applied. In this instance, as illustrated in FIG. 11A(*b*), when a pattern formed with the plurality of taps corresponds to a preset pattern, and the application of the plurality of taps is terminated, the controller 180 can activate the display unit 151, and execute a preset application. Further, the preset application may be an application with a high user's use frequency, an application being executed prior to the locked state of the mobile terminal, and the like.

Figure 11B:
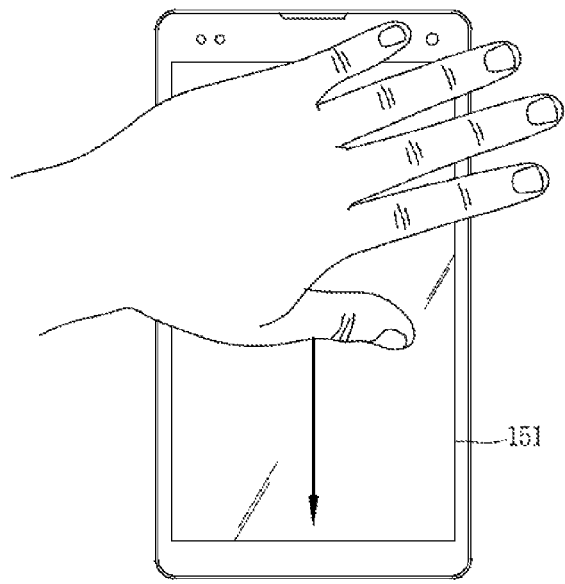
Figure 11B:
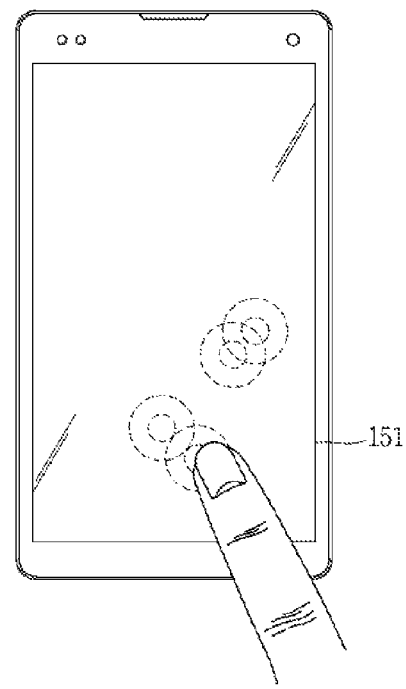
Figure 11B:
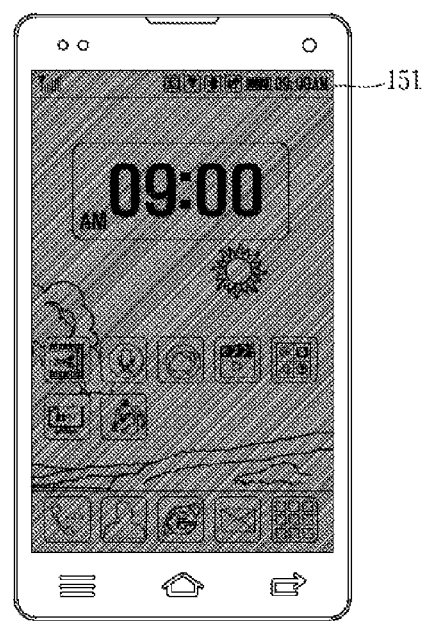

In another example, as illustrated in FIG. 11B(*a*), the controller 180 can sense a user's gesture when the display unit 151 is in an inactive state. For example, the controller 180 can apply a gesture for swiping a front surface of the display unit 151.

Then, as illustrated in FIG. 11B(*b*), the controller 180 can sense a plurality of taps applied when the display unit 151 is in an inactive state. In addition, when a pattern formed with the plurality of taps corresponds to a preset pattern, the controller 180 can execute a function linked with a combination of the gesture and the pattern. For example, the function linked with the combination may be a function of setting the brightness of the mobile terminal to a preset value. For example, as illustrated in FIG. 11B(*c*), the controller 180 can adjust the brightness of the mobile terminal to "0".

In still another example, the controller 180 can sense the movement of the body prior to applying the plurality of taps. Then, the controller 180 can detect whether or not a pattern formed with a plurality of taps applied when the display unit 151 is in an inactive state corresponds to a preset pattern. When the pattern formed with a plurality of taps corresponds to a preset pattern, the controller 180 can execute a preset function.

Figure 11C:
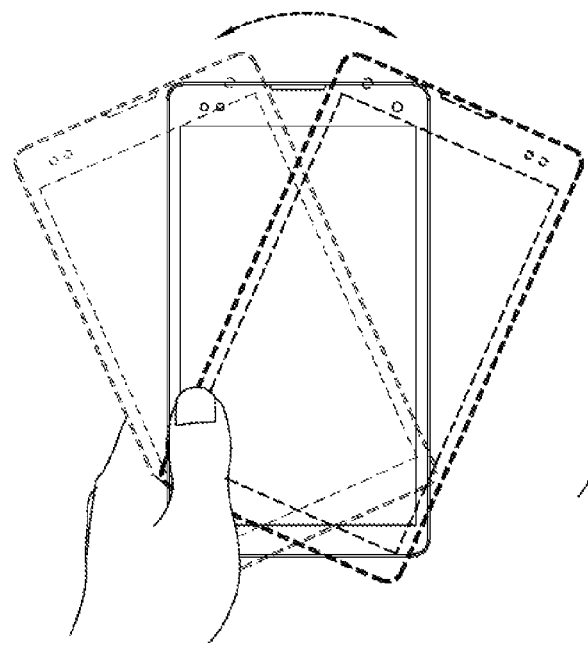
Figure 11C:
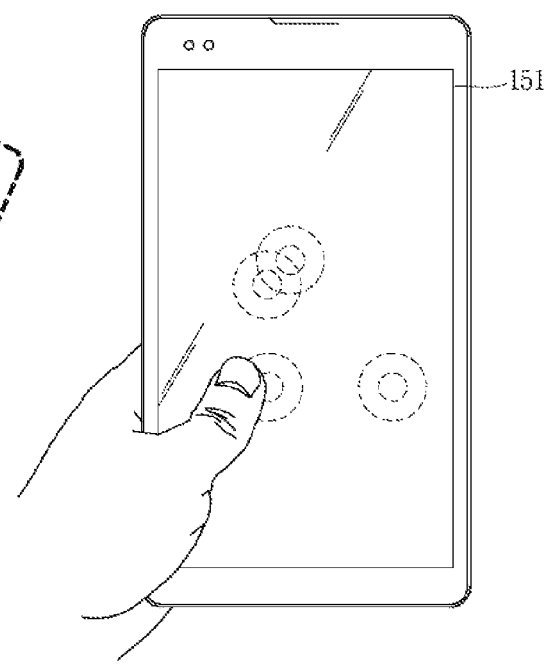
Figure 11C:
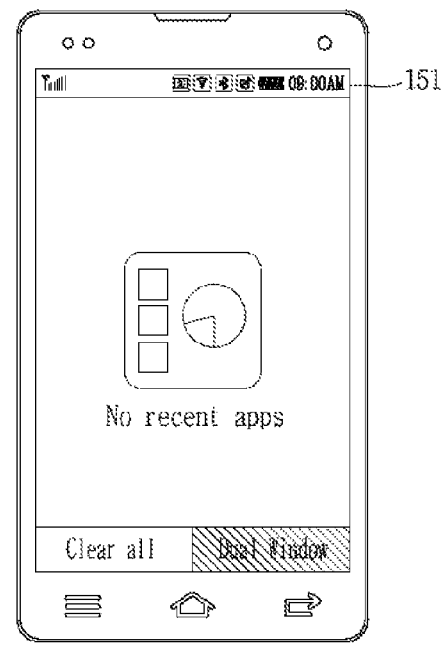

For example, as illustrated in FIGS. 11C(a), 11C(b) and 11C(c), the controller 180 can sense a plurality of taps subsequent to sensing the movement of horizontally shaking the body, the controller 180 can perform a function of terminating a currently executed application.

In still another example, the controller 180 can detect whether or not a proximity sensor provided in the mobile terminal is hidden to perform a preset function. Referring to FIG. 11(a), the controller 180 can determine whether or not the proximity sensor is hidden when the proximity sensor is hidden by the user's hand.

Then, when the proximity sensor is hidden, the controller 180 can sense a plurality of being applied to the display unit 151. In addition, when the pattern formed with a plurality of taps corresponds to a preset pattern, the controller 180 can switch a locked state to a released state, and change the output mode of the mobile terminal. Further, the output mode may include a sound mode for outputting a sound, a vibration mode for outputting a vibration, and a mute mode the sound and vibration output is restricted.

Figure 11D:
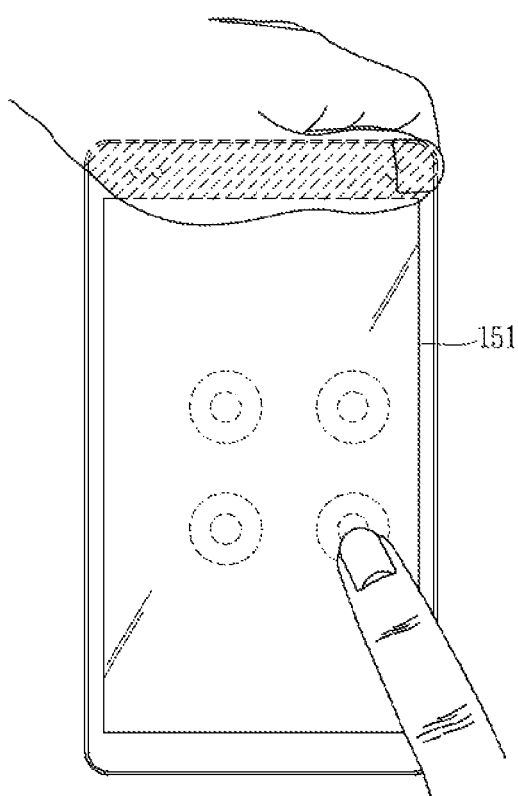
Figure 11D:
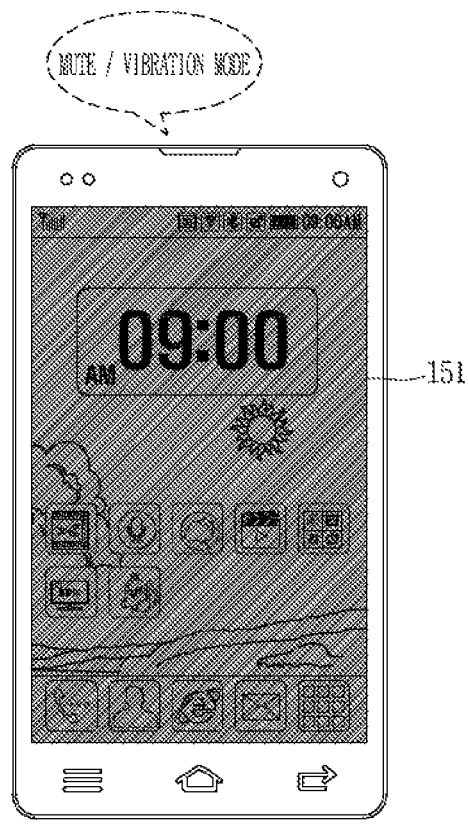

More specifically, as illustrated in FIG. 11D(b), when the pattern formed with a plurality of taps corresponds to a preset pattern, the controller 180 can change the output mode to a vibration mode or mute mode. In still another example, the controller 180 can perform a function linked with a drag input based on the drag input consecutive to the last tap while maintaining the last tap of a plurality of taps applied when the display unit 151 is in an inactive state.

Figure 11E:
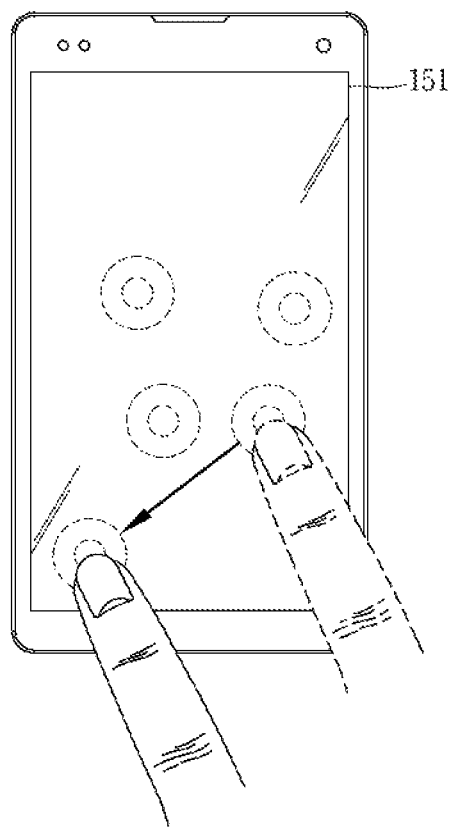
Figure 11E:
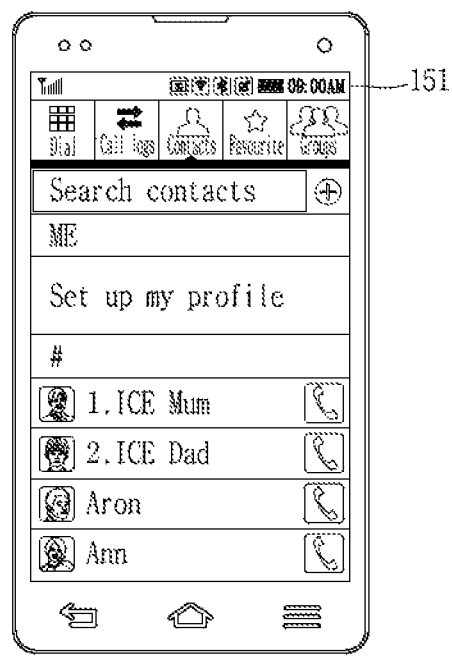

For example, as illustrated in FIGS. 11E(a) and 11F(b), upon sensing the drag input, the controller 180 can execute a preset application. For example, the controller 180 can switch a locked state to a released state, and activate the display unit 151, and execute an email application.

Moreover, the controller 180 can execute a different application based on a direction of applying the drag input. In other words, an embodiment of the present invention can execute various applications based on various directions of the drag input applied when the display unit 151 is in an inactive state. In still another example, the controller 180 can sense a plurality of taps when the display unit 151 is in an inactive state, and maintain a tap that has been finally applied among the plurality of taps. The controller 180 can sense a gesture for performing a call, which is taken by the user, when the finally applied tap is maintained. Further, the gesture for performing a call may be sensed through a gravity sensor and a proximity sensor provided in the mobile terminal.

Figure 11F:
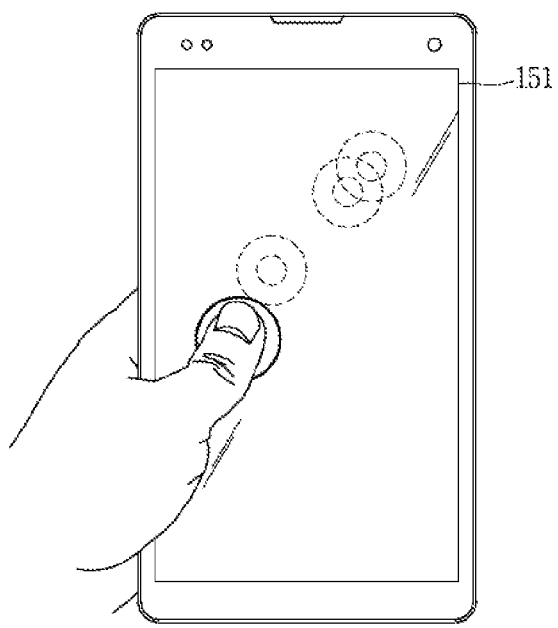
Figure 11F:
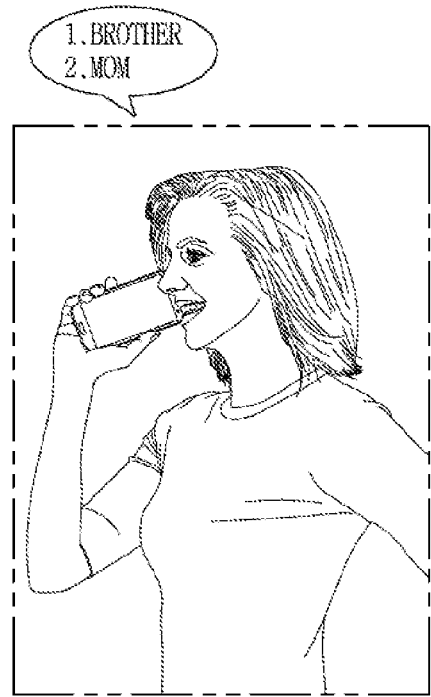
Figure 11F:
Figure 11F:
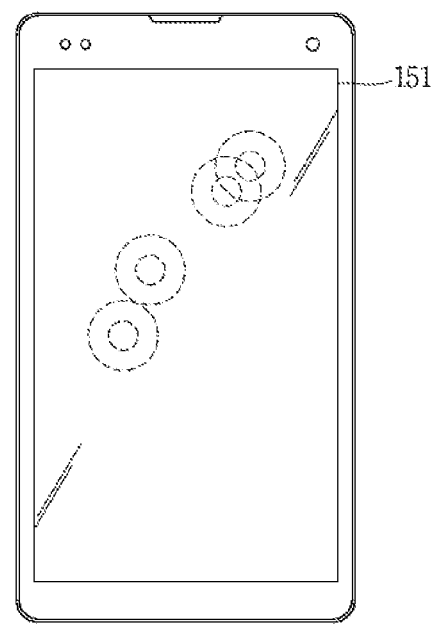

In addition, as illustrated in FIG. 11F(b), the controller 180 can sequentially display a recent call log through voice when the last tap is maintained. When the maintaining of the finally applied tap is released when the call log is displayed, the controller 180 can detect call log information being output with voice at the release time point, and perform a call to an external terminal indicated by the call log information. For example, as illustrated in FIGS. 11F(c) and 11F(d), if the maintaining of the last tap is released, then the controller 180 can perform a call to "mom" when the call log that has been uttered is "mom".

Figure 12A:
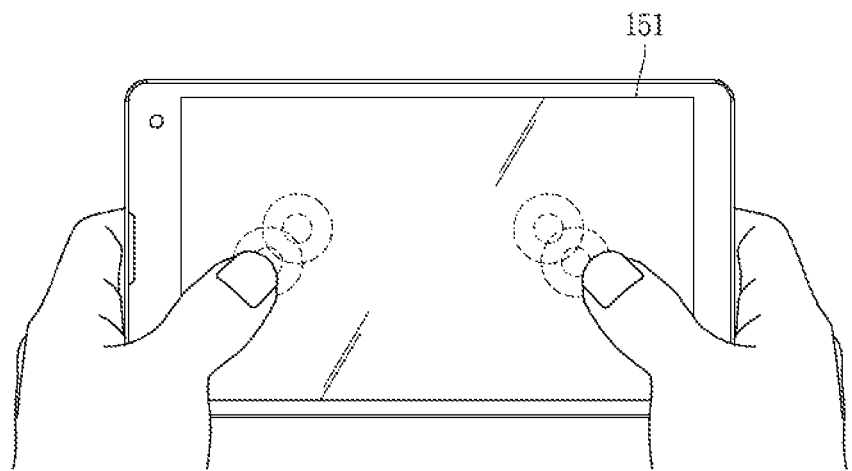
FIGS. 12A(a) to (b), 12B(a) to (b) and 12C(a) to (b) are conceptual views illustrating a method of activating a camera when a plurality of taps are applied, and the movement of the body corresponds to a preset movement, and a camera executable state is sensed while the display unit is in an inactive state.
Figure 12A:
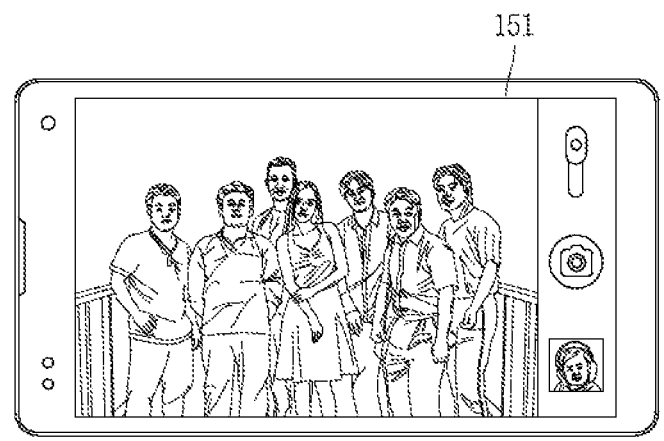
Figure 12B:
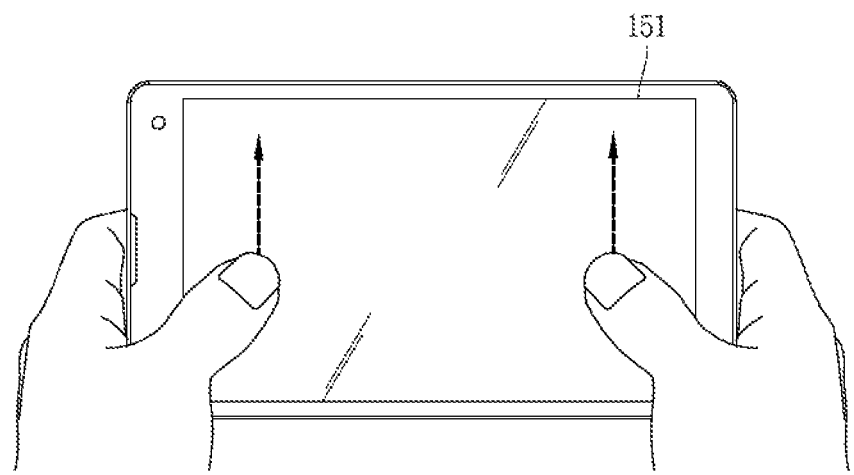
Figure 12B:
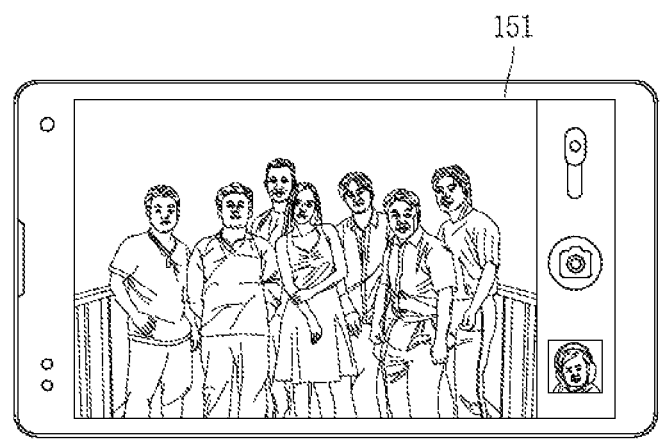
Figure 12C:
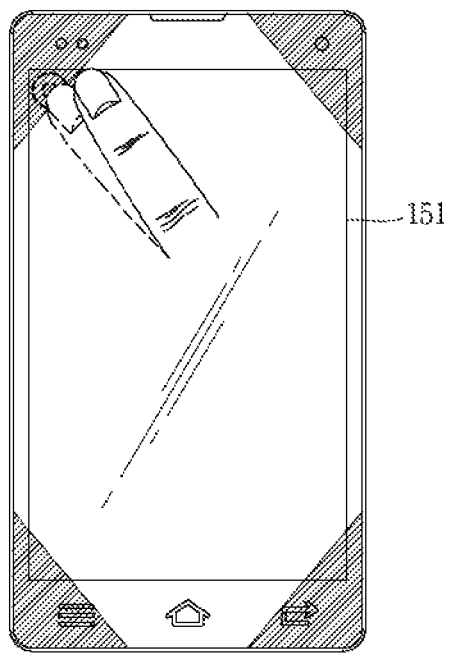
Figure 12C:

In the above, a method of performing various functions based on a plurality of taps applied when the display unit 151 is in an inactive state and the state of the body has been described. Hereinafter, a method of activating the camera when a plurality of taps are applied when sensing that the display unit 151 is in an inactive state, and the movement of the body corresponds to a preset movement, and the execution of the camera is in an enabled state will be described. FIGS. 12A, 12B and 12C are conceptual views illustrating a method of activating a camera when a plurality of taps are applied, and the movement of the body corresponds to a preset movement, and a camera executable state is sensed while the display unit 151 is in an inactive state.

A mobile terminal according to an embodiment of the present invention may further include a front camera 121a disposed on a front surface of the body and a rear camera 121b disposed on a rear surface of the body. In addition, the controller 180 can change a method of executing the camera when the display unit 151 is in an inactive state according to whether the mobile terminal is in a locked state or in a released state.

For example, when a mobile terminal according to an embodiment of the present invention is in a locked state, the controller 180 can sense that a plurality of taps are applied within a preset period of time when the display unit 151 is in an inactive state, and the body of the mobile terminal is in a horizontal mode.

When the movement of the body corresponds to a preset movement, and the rear camera 121b is in an usable state, the controller 180 can activate the rear camera 121b, and display an image received from the rear camera 121b on the display unit 151. Further, the usable state of the rear camera 121b may denote a state in which the reception of a front image of the rear camera 121b is enabled. For example, it may denote a state in which any object obstructing the reception of an image is not placed in front of the rear camera 121b.

For example, as illustrated in FIG. 12A(a), when the mobile terminal is in a locked state, the controller 180 can consecutively sense a plurality of taps within a preset period of time on the display unit 151 in an inactive state while the body is in a horizontal mode. At the same time, the controller 180 can check whether or not to receive an image from the rear camera 121b.

In addition, as illustrated in FIG. 12A(b), when the reception of an image from the rear camera 121b is enabled, the controller 180 can activate the rear camera 121b, and display an image received from the rear camera 121b on the display unit 151. In another example, as illustrated in FIG. 12B(a), when the mobile terminal is in a released state, the controller 180 can immediately execute the rear camera 121b when a preset direction of the drag input is applied to the display unit 151 in an inactive state.

In still another example, the controller 180 can operate a preset application based on a plurality of taps being applied to a specific region of the display unit 151 when the display unit 151 is in an inactive state. In addition, the controller 180 can operate the preset application using a different control command when the mobile terminal is in a locked state or in a released state.

For example, FIG. 12C(a), when the mobile terminal is in a released state, the controller 180 can operate a preset application when a plurality of taps are applied to a specific region thereof within a preset period of time. In addition, as illustrated in FIG. 12C(b), the controller 180 can activate the display unit 151 in the inactive state, and display the execution screen of the preset application on the display unit 151.

Yet still another example, though not shown in the drawing, when the mobile terminal is in a locked state, the controller 180 can operate a preset application when a pattern formed with a plurality of taps applied to a specific region thereof corresponds to a preset pattern. In addition, the controller 180 can activate the display unit 151 in an inactive state, and display the execution screen of the preset application on the display unit 151. Thus, an embodiment of the present invention can more quickly execute a preset application using a plurality of taps applied to a specific region thereof.

A mobile terminal according to an embodiment of the present invention may perform various functions based on a pattern formed with a plurality of taps applied to the body when the display unit is in an inactive state. In addition, the mobile terminal can perform various functions even when the display unit is not activated, the user can quickly perform a function without any procedure of activating the display unit.

Furthermore, in a mobile terminal according to an embodiment of the present invention, a touch sensor for sensing a touch when the display unit is in an inactive state is periodically activated or deactivated. In addition, when a first tap is applied to the deactivated display unit, the touch sensor may be completely activated to sense a second tap to be applied afterwards, thereby correctly calculating a tap pattern as well as reducing power consumption due to the sensing unit.

In addition, a mobile terminal according to an embodiment of the present invention may perform various functions based on the state of the body along with a plurality of tap inputs. Thus, a more convenient, fast function which is suitable for the situation to the user can be provided.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a terminal body;
   a wireless communication unit;
   a display; and
   a controller configured to:
   sense a plurality of taps applied to the display in a deactivated state in which illumination is not applied to the display,
   detect a current state of the terminal body when a tapped pattern formed with the plurality of taps matches a pre-set pattern,
   release a lock state of the mobile terminal and switch the display from the deactivated state to an activated state in which illumination is applied to the display after detecting the current state of the terminal body, and
   execute a preset function associated with the current state of the terminal body,
   wherein information of the preset function is displayed on the activated display.

2. The mobile terminal of claim 1, wherein the controller is further configured to switch at least part of the display to an activate state and display the information of the preset function based on a last tap of the plurality of taps maintaining contact on the display.

3. The mobile terminal of claim 1, wherein the preset function corresponds to a multimedia function or a camera function when the current state of the terminal is a horizontal state.

4. The mobile terminal of claim 3, further comprising:
   a camera provided on a rear surface of the terminal body,
   wherein the controller is further configured to perform the multimedia function or the camera function based on a state of the camera.

5. The mobile terminal of claim 4, wherein the controller is further configured to perform the multimedia function when the state of the camera is in an image unreceivable state and perform the camera function when the state of the camera is in an image receivable state.

6. The mobile terminal of claim 1, further comprising:
   a first camera on a front surface of the terminal body and a second camera on a rear surface of the terminal body,
   wherein the controller is further configured to activate the first camera when the current state of the mobile terminal indicates the mobile terminal is inclined more than a predetermined angle and activate the second camera when the state of the mobile terminal indicates the mobile terminal is not inclined more than the predetermined angle.

7. The mobile terminal of claim 6, wherein the controller is further configured to maintain an active state of the first or second camera even when a last tap of the plurality of taps is no longer maintained.

8. The mobile terminal of claim 1, wherein the tapped pattern is linked with a specific person's identification information, and
   wherein the preset function is associated with the specific person's identification information.

9. The mobile terminal of claim 8, wherein the preset function includes a plurality of preset functions associated with the specific person's identification information, and
   wherein the controller is further configured to perform any one of the plurality of preset functions according to the current state of the terminal.

10. The mobile terminal of claim 8, further comprising:
    a proximity sensor unit configured to sense whether or not an object exists within a preset distance from the terminal body,
    wherein the preset function includes calling an external terminal indicated by the specific person's identification information when the proximity sensor senses the object within the preset distance.

11. The mobile terminal of claim 8, wherein the preset function includes a route guidance function using destination information associated with the specific person's identification information when the mobile terminal is placed on an external object.

12. The mobile terminal of claim 8, further comprising:
    a light-emitting unit configured to emit light having any one of a plurality of colors,
    wherein the controller is further configured to display notification information using the light emitting-emitting unit indicating the applied plurality of taps matching the preset pattern are linked with the specific person's identification information.

13. The mobile terminal of claim 1, further comprising:
    a proximity sensor unit configured to sense whether or not an object is covering at least a portion of the display,
    wherein the preset function includes displaying notification information indicating an occurrence of an event on the mobile terminal in a remaining portion of the display which is not covered by the object.

14. The mobile terminal of claim 13, wherein the controller is further configured to:
   receive a selection of a corresponding notification included in the displayed notification information,
   activate a partial portion of the display, and
   display screen information linked with the corresponding notification on the activated partial portion of the display.

15. The mobile terminal of claim 3, wherein the current state of the terminal includes the mobile terminal facing an external terminal for short range wireless communication, and
   wherein the preset function includes transmitting information to the external terminal that corresponds to the preset pattern.

16. The mobile terminal of claim 1, wherein the controller is further configured to:
   execute an application on the mobile terminal in a background state while maintaining the deactivated display, and
   wherein the preset function includes controlling the application in the background state based on a touch drag gesture received following a last tap of the plurality of taps.

17. The mobile terminal of claim 16, wherein the background application includes playing music, and
   wherein the preset function includes controlling a volume of the playing music based a direction of the touch drag gesture.

18. A method of controlling a mobile terminal, the method comprising:
   receiving a plurality of taps applied to a display in a deactivated state in which illumination is not applied to the display;
   detecting a current state of the mobile terminal when a tapped pattern formed with the plurality of taps matches a pre-set pattern;
   releasing a lock state of the mobile terminal and switching the display from the deactivated state to an activated state in which illumination is applied to the display after detecting the current state of the mobile terminal; and
   executing a preset function associated with the current state of the mobile terminal,
   wherein information of the preset function is displayed on the activated display.

19. The method of claim 18, further comprising:
   switching at least part of the display to the activate state; and
   displaying the information of the preset function based on a last tap of the plurality of taps maintaining contact on the display.

20. The method of claim 18, wherein the preset function corresponds to a multimedia function or a camera function when the current state of the terminal is a horizontal state.

* * * * *